(12) United States Patent
Flynt et al.

(10) Patent No.: US 8,713,480 B2
(45) Date of Patent: Apr. 29, 2014

(54) EXTENSIBLE, FILTERED LISTS FOR MOBILE DEVICE USER INTERFACE

(75) Inventors: David Wayne Flynt, Lake Forest Park, WA (US); Bryan T. Agnetta, Seattle, WA (US); Sally Louise Barton, Seattle, WA (US); Peter G. Chin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 11/765,684

(22) Filed: Jun. 20, 2007

(65) Prior Publication Data

US 2007/0240079 A1    Oct. 11, 2007

Related U.S. Application Data

(63) Continuation of application No. 11/424,713, filed on Jun. 16, 2006.

(60) Provisional application No. 60/718,187, filed on Sep. 16, 2005.

(51) Int. Cl.
*G06F 3/048*      (2013.01)

(52) U.S. Cl.
USPC ........... 715/847; 715/810; 715/812; 715/825; 715/828; 715/829; 715/830; 715/841; 715/726

(58) Field of Classification Search
USPC ......... 715/810, 847, 812, 825, 828, 829, 830, 715/841, 726
See application file for complete search history.

(56) References Cited

U.S. PATENT DOCUMENTS

| | | | |
|---|---|---|---|
| 5,559,945 A | 9/1996 | Beaudet et al. | |
| 5,623,613 A | 4/1997 | Rowe et al. | |
| 5,855,006 A | 12/1998 | Huemoeller et al. | |
| 5,855,015 A | 12/1998 | Shoham | |
| 6,052,145 A | 4/2000 | Macrae et al. | |
| 6,356,283 B1 | 3/2002 | Guedalia | |
| 6,366,302 B1 * | 4/2002 | Crosby et al. | 715/786 |
| 6,574,624 B1 | 6/2003 | Johnson et al. | |
| 6,621,532 B1 * | 9/2003 | Mandt | 348/841 |
| 6,724,403 B1 | 4/2004 | Santoro et al. | |
| 6,948,135 B1 * | 9/2005 | Ruthfield et al. | 715/854 |
| 7,082,409 B1 | 7/2006 | Cherry | |
| 7,181,438 B1 | 2/2007 | Szabo | |
| 7,346,610 B2 * | 3/2008 | Ruthfield et al. | 1/1 |

(Continued)

OTHER PUBLICATIONS

OA Dated Dec. 29, 2008 for U.S. Appl. No. 11/424,713, 31 pages.

(Continued)

*Primary Examiner* — Shen (Connie) Shiau
(74) *Attorney, Agent, or Firm* — Sung Kim; Andrew Sanders; Micky Minhas

(57) ABSTRACT

The subject disclosure pertains to systems and methods for providing an improved user interface for mobile devices. Access to data and services from multiple software applications can be provided through a group or list of items. Each group or list can include multiple items, which can be associated with data or tasks from multiple applications. The set of groups of items can be both customizable and extensible to allow users to locate and utilize data and tasks relevant to the particular user. The set of item groups can provide users with a filtered view of content available through the mobile device, enhancing access to subset of data and tasks available on the mobile device.

19 Claims, 20 Drawing Sheets

(56) References Cited

U.S. PATENT DOCUMENTS

| | | |
|---|---|---|
| 7,376,907 B2 | 5/2008 | Santoro et al. |
| 7,424,541 B2 | 9/2008 | Bourne |
| 7,454,713 B2 * | 11/2008 | Spalink et al. ............... 715/828 |
| 7,577,922 B2 | 8/2009 | Mann et al. |
| 7,873,153 B2 | 1/2011 | Bukovec et al. |
| 7,933,632 B2 | 4/2011 | Flynt et al. |
| 7,983,947 B2 | 7/2011 | Kaiwa et al. |
| 2001/0015721 A1 * | 8/2001 | Byun et al. ................... 345/169 |
| 2002/0044149 A1 | 4/2002 | McCarthy et al. |
| 2002/0065939 A1 | 5/2002 | Liu |
| 2002/0082961 A1 | 6/2002 | Abrahm et al. |
| 2002/0112012 A1 * | 8/2002 | Jones et al. ................... 709/206 |
| 2002/0115476 A1 | 8/2002 | Padawer et al. |
| 2002/0133488 A1 | 9/2002 | Bellis et al. |
| 2002/0138474 A1 | 9/2002 | Lee |
| 2002/0143755 A1 | 10/2002 | Wynblatt et al. |
| 2002/0156646 A1 | 10/2002 | Kaiwa et al. |
| 2003/0004936 A1 | 1/2003 | Grune et al. |
| 2003/0035008 A1 | 2/2003 | Fuller et al. |
| 2003/0100315 A1 | 5/2003 | Rankin |
| 2003/0151623 A1 | 8/2003 | Shimada et al. |
| 2003/0158839 A1 | 8/2003 | Faybishenko et al. |
| 2003/0177111 A1 | 9/2003 | Egendorf et al. |
| 2003/0208456 A1 | 11/2003 | Greenstein |
| 2004/0030741 A1 | 2/2004 | Wolton et al. |
| 2004/0053605 A1 | 3/2004 | Martyn et al. |
| 2004/0061716 A1 | 4/2004 | Cheung et al. |
| 2004/0122683 A1 | 6/2004 | Grossman et al. |
| 2004/0142720 A1 | 7/2004 | Smethers |
| 2004/0203656 A1 | 10/2004 | Andrew et al. |
| 2004/0221243 A1 * | 11/2004 | Twerdahl et al. ............. 715/834 |
| 2004/0250217 A1 | 12/2004 | Tojo et al. |
| 2004/0260692 A1 | 12/2004 | Brill et al. |
| 2004/0261031 A1 * | 12/2004 | Tuomainen et al. .......... 715/739 |
| 2004/0268265 A1 | 12/2004 | Berger |
| 2005/0050001 A1 | 3/2005 | Lucas et al. |
| 2005/0119031 A1 * | 6/2005 | Spalink et al. ................ 455/566 |
| 2005/0128974 A1 | 6/2005 | Yamada et al. |
| 2005/0149512 A1 * | 7/2005 | Ruthfield et al. ................. 707/3 |
| 2005/0160076 A1 | 7/2005 | Kanemasa |
| 2005/0207432 A1 | 9/2005 | Velez-Rivera et al. |
| 2005/0228780 A1 | 10/2005 | Diab et al. |
| 2005/0240592 A1 | 10/2005 | Mamou et al. |
| 2005/0262062 A1 | 11/2005 | Xia |
| 2005/0273723 A1 * | 12/2005 | Sharpe ......................... 715/764 |
| 2006/0039548 A1 | 2/2006 | Houmura et al. |
| 2006/0058026 A1 | 3/2006 | Ang et al. |
| 2006/0106861 A1 | 5/2006 | Torgerson et al. |
| 2006/0123360 A1 * | 6/2006 | Anwar et al. ................. 715/810 |
| 2006/0160528 A1 * | 7/2006 | Wang et al. ................... 455/418 |
| 2006/0168539 A1 | 7/2006 | Hawkins et al. |
| 2006/0190833 A1 | 8/2006 | SanGiovanni et al. |
| 2006/0242586 A1 | 10/2006 | McGlinchey et al. |
| 2006/0248045 A1 | 11/2006 | Toledano et al. |
| 2007/0192712 A1 * | 8/2007 | Lee et al. ...................... 715/764 |

OTHER PUBLICATIONS

OA Dated Dec. 1, 2008 for U.S. Appl. No. 11/424,720, 20 pages.
OA Dated Sep. 17, 2008 for U.S. Appl. No. 11/424,706, 32 pages.
U.S. Appl. No. 11/424,706, Final Office Action dated May 23, 2012, 30 pages.

* cited by examiner

EXTENSIBLE, FILTERED LISTS FOR MOBILE DEVICE USER INTERFACE

CROSS-REFERENCE TO RELATED APPLICATIONS

This is a continuation application of U.S. patent application Ser. No. 11/424,713, filed Jun. 16, 2006, entitled "EXTENSIBLE, FILTERED LISTS FOR MOBILE DEVICE USER INTERFACE", which claims the benefit under 35 U.S.C. 119(e) of U.S. Provisional Patent application Ser. No. 60/718,187 entitled "ENHANCED PORTABLE DEVICE NAVIGATION TOOLS" and filed Sep. 16, 2005, the entirety of these applications are incorporated herein by reference. This application is also related to co-pending U.S. patent application Ser. No. 11/424,720, entitled, "SEARCH INTERFACE FOR MOBILE DEVICES", filed Jun. 16, 2006; U.S. patent application Ser. No. 11/424,706, entitled, "CONTENT SHARING USER INTERFACE FOR MOBILE DEVICES", filed Jun. 16, 2006; and U.S. patent application Ser. No. 11/424,733, entitled, "TILE SPACE USER INTERFACE FOR MOBILE DEVICES", and filed Jun. 16, 2006. The entireties of the above-noted applications are incorporated by reference herein.

BACKGROUND

Mobile or portable devices have become increasingly popular and prevalent in today's society. Many users utilize a mobile device, such as a cell phone, as their primary means of communication and carry such devices with them constantly. Mobile devices can include multiple functions such as cellular phone service, voice over Internet protocol ("VoIP") phone service, software applications, email access, Internet capabilities, calendar functions, music players and the like. Functions, features and capabilities have increased both the utility and complexity of mobile devices. It is likely that functions will continue to be added to mobile devices further increasing both usefulness and intricacy.

While consumers desire additional functionality, the sheer volume of information and features make it difficult for users to access commonly used data and functions. The complexity also makes it difficult for users to fully exploit the capabilities of such devices. The problem is exacerbated by the generally limited user interfaces of mobile devices. Such devices are designed to be small, lightweight and easily portable. Consequently, mobile devices typically have limited display screens, keypads, keyboards and/or other input devices. Due to the size of the user input devices and display screens, it may be difficult for users to enter, retrieve and view information using mobile devices.

Users may have difficulty in accessing the information or function they desire due to organization of the volume and variety of information that may be contained in or accessed by the mobile device, as well as the growing number of functions such devices are capable of supporting. Conventional menu structures for mobile devices require users to remember a hierarchy of functions or applications to reach the desired data or task. Information is frequently organized based upon the application software that provides or manages the information. Consequently, users can be required to access information based upon the various software applications rather than based upon user utility. Users can become frustrated when they are unable to locate the desired information or tasks and may be unable to fully exploit the functions and advantages of the mobile device.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns an improved user interface for mobile devices such as smartphones, personal digital assistants (PDAs) and the like. Selected data and services provided by multiple software applications can be accessed through a group or list of items. Each group or list can include multiple items that provide access to data or tasks from multiple applications. For example, a list centered around a user's current day can include items corresponding to meetings scheduled for that day using a calendar application, email received on that day through an email application, and a weather forecast for the day provided by a weather service application.

A customizable set of lists of items can be defined to allow users to quickly access relevant content such as commonly used data or tasks. Users can add, delete, reorder and/or edit lists or items to personalize and increase usability of the mobile device. For example, in addition to the list based upon a user's day described above, a user can define a list to manage music or audio files and a separate, second list to manage pictures or images. Items in lists can be updated based upon specific user selections. In addition, the items can be dynamically updated based upon changes in the underlying data or services provided by software applications.

The set of lists can provide users with a filtered view of content and tasks available using the mobile device. While the full extent of underlying software applications remains available through the applications, the set of lists can enhance usability by providing a user with the ability to quickly access the most relevant or commonly used data or tasks. For example, a user may have data for hundreds of contacts or persons stored in the mobile device. However, the user typically communicates with only ten of those contacts on a daily basis. Those ten contacts can be maintained in a list of items. Information for the ten contacts can be accessed directly from the list rather than through the contact application. The full set of contacts can remain accessible through the contact application.

In addition, a shortcut display can be provided to facilitate navigation of a horizontal list, such as the set of lists. A shortcut display can reorganize elements of the horizontal list as a vertical list, which typically allows additional items to be displayed. Selection of an item or element of the shortcut list triggers a return to the parent, horizontal list. On return, the parent list is updated such that the item selected within the shortcut list has focus in the parent list. The shortcut list allows users to navigate rapidly through the parent list.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
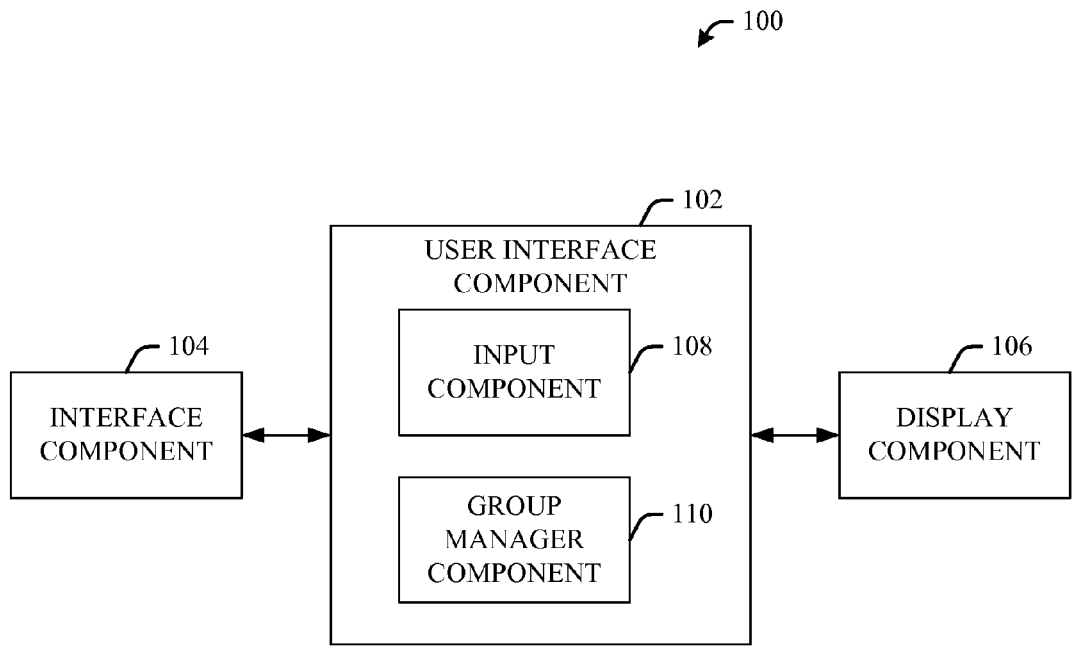
FIG. 1 is a block diagram of a system for providing an enhanced display in accordance with an aspect of the subject matter disclosed herein.

The various aspects of the subject matter described herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Content on mobile devices can take many forms including, but not limited to, contact information, calendar items, mail, music, photos, documents, and tasks. Access to content including data and available tasks is typically provided only through software applications specific to the data type of the content, such as an application used to create or render the specific content data type. For example, to read email from a contact, a user may be required to navigate to and open an email application. To call that same contact with a question regarding that email, the user may be required to navigate to the space where that contact's communication details are visible (e.g., a contact card specifying contact specific information). Finding relevant information can require first determining the appropriate software application, opening the application and searching for the relevant information within the application. For example, to view mail from a specific sender, the user may be required to navigate to email and search by the sender's name.

A set of lists or groups of items can be included in a user interface to provide users with expedited access to relevant content including tasks and data. Here, the terms "item group" or "item list" can be used interchangeably to indicate a set of items. Sets of item groups can be used to shift the paradigm of mobile devices from an application centric model to a content centric model, resulting in a content based user interface rather than an application based user interface. Item groups can be used to surface content that is typically reachable only through an application. Item groups can be used to eliminate a level of indirection and provide direct access to a subset of application content, thereby increasing accessibility of content and usability of the mobile device.

Item groups can offer a filtered view of the content and tasks provided by one or more software applications. For instance, although users may have information for a large number of contacts, only a small subset (e.g., ten contacts) are likely to be relevant on a day-to-day basis. While users may want to be able to access all contacts, item groups can provide faster, easier access to the subset of contacts that the user utilizes on a daily basis. Accordingly, item groups can offer a filtered view of data and tasks, providing limited access to content and tasks most likely to be relevant. Software applications can still provide access to the remainder of content and tasks.

Item groups can be customized to allow users to specifically select the relevant or important items to include within one or more item groups. Alternatively, a mobile device can select content to be included in item groups automatically based on usage patterns or other indicia of relevance. For example, the most recently viewed contacts can be maintained in an item group.

Referring now to FIG. 1, a display system 100 for a mobile device in accordance with an aspect of the subject matter disclosed herein is illustrated. The system 100 can include a user interface component 102 that receives input from one or more interface components 104 and changes the view of a display on a mobile device (not shown) via a display component 106 according to such input. The system 100 can operate on any type of mobile computing device, including, but not limited to, a PDA, text messenger, cellular phone, pocket personal computer, smartphone, ultra-mobile tablet PC and the like. Input from the interface component 104 can include content obtained from one or more software applications. Input can also include user input using a touch screen, keypad, joystick, or other type of button control. A single interface component 104 is illustrated herein for simplicity; however, multiple interface components 104 can be utilized including separate interface components for user input and input from software applications. The user interface component 102 can include an input component 108 that receives and/or requests input including user input and content used to generate the display from the interface component 104. In addition, the user interface component 102 can include a group manager component 110 that manages a set of item groups available for display.

The interface component 104 can include or can be connected to a content sharing system capable of facilitating sharing of content from multiple software applications. A content sharing system can provide a standard interface between clients such as the interface component 104 and applications providing content. This interface ensures that clients need not have knowledge of the underlying data structures or even the identity of applications to access content.

A content sharing system can manage the supply of data and simple tasks associated with the data to the interface component 104. Applications can register new categories or classifications of data and associated tasks with the content sharing system, automatically allowing the interface component 104 to access the new data categories and tasks. Applications can also provide the content sharing system with data supplier components capable of retrieving data from the underlying data stores of the applications. In addition, applications can provide task executors capable of executing actions or tasks on selected data types or categories. The central content sharing system can provide data and tasks to clients in response to queries or requests.

The interface component 104 can obtain data and associated tasks by generating a query specifying the category or type of data requested as well as context used to identify relevant data of the requested category. A set of data requests based upon the query from a client can be distributed to data supplier components for various software applications. The data supplier components can retrieve the relevant data from the underlying data stores of associated applications and the retrieved results can be assembled and returned to the interface component 104. The query, data requests and query results can be specified in a declarative language, such as extended markup language (XML) to facilitate transfer of data without requiring knowledge of data structures by the client.

In another embodiment, the interface component 104 can interact directly with one or more software applications. Applications can notify the interface component 104 of a change to content and provide updated content directly to the interface component 104. In addition, the interface component can poll or request content from one or more applications either dynamically or periodically.

Figure 2:
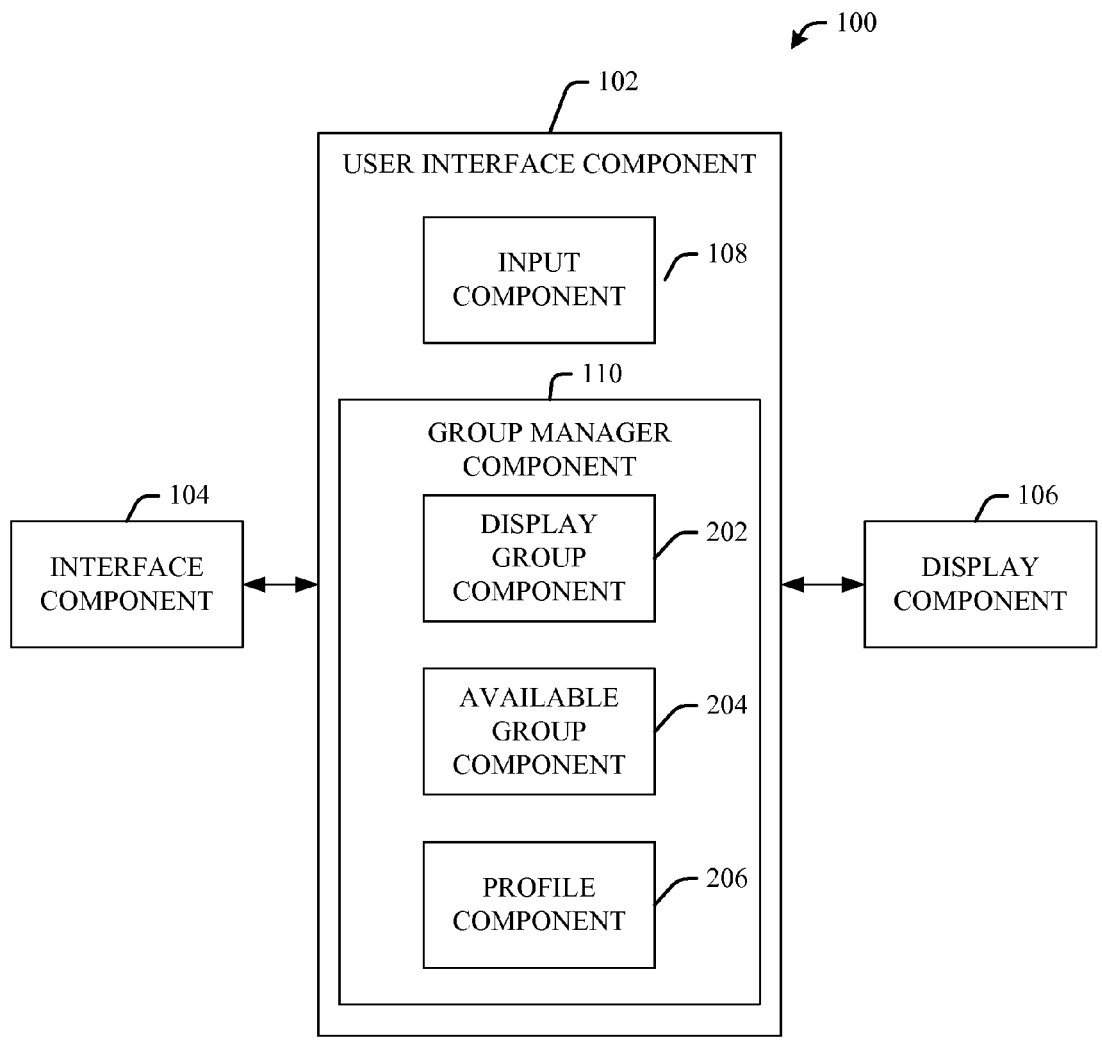
FIG. 2 is a block diagram of a system for managing groups of items in accordance with an aspect of the subject matter disclosed herein.

Referring now to FIG. 2, a group manager component 110 is illustrated in detail. The group manager component 110 can include a display group component 202, an available group component 204 and a profile component 206. Any number of item groups can be available and/or used to generate a display. The display group component 202 can manage a set of item groups currently ready for display, referred to herein as the set of display item groups. The item groups included in the set of display item groups are not necessarily viewable on a display screen at any given time. However, each item group within the set of display item groups is updated and ready for display. Items included in the item groups within the set of display item groups can be dynamically updated based upon changes in content to ensure that each item group is available for display.

The available group component 204 can manage one or more item groups that are not currently included in the set of display item groups. For example, a large number of possible item groups can be generated either by the user, vendors or other entities. The user can select from this large set of available item groups to determine item groups to include within the set of display item groups. Users can add or delete item groups from the set of available item groups as well as the set of display item groups.

Users can generate and/or utilize one or more user profiles to specify item groups to be included in the set of display item groups. The profile component 206 can manage one or more user profiles. Different user profiles can be generated to reflect the varying needs or interests of a user. Profiles can be generated based upon location, time of day, day of week, user context or any other user condition. For example, a user can specify a work profile that includes a set of item groups specific to the user's occupation. The user can also create a separate user profile for use outside of work that can include entertainment information, personal contacts and the like. Users can create profiles specific to geographic locations, which can be particularly useful for users that travel frequently. A user profile can also effect other mobile device or user interface settings and is not necessarily limited to specifying the set of display item groups.

Sets of display item groups can be updated or replaced by selecting user profiles. Users can view a list of possible user profiles and select the most appropriate profile for their current context. Alternatively, the current user profile can be automatically updated based upon one or more predetermined conditions, such as time of day or day of week. For example, a determination can be made that it is a weekend day and the weekend user profile can be utilized to generate a set of display item groups. If the mobile device is capable of determining location, the mobile device can select a user profile based upon geographic location. For instance, the mobile device can determine if the user is at home, at work or on travel and select the most appropriate user profile. A user can override any user profile selections either by electing a different user profile or by individually adding and/or deleting item groups and items from the current set of display item groups.

Figure 3:
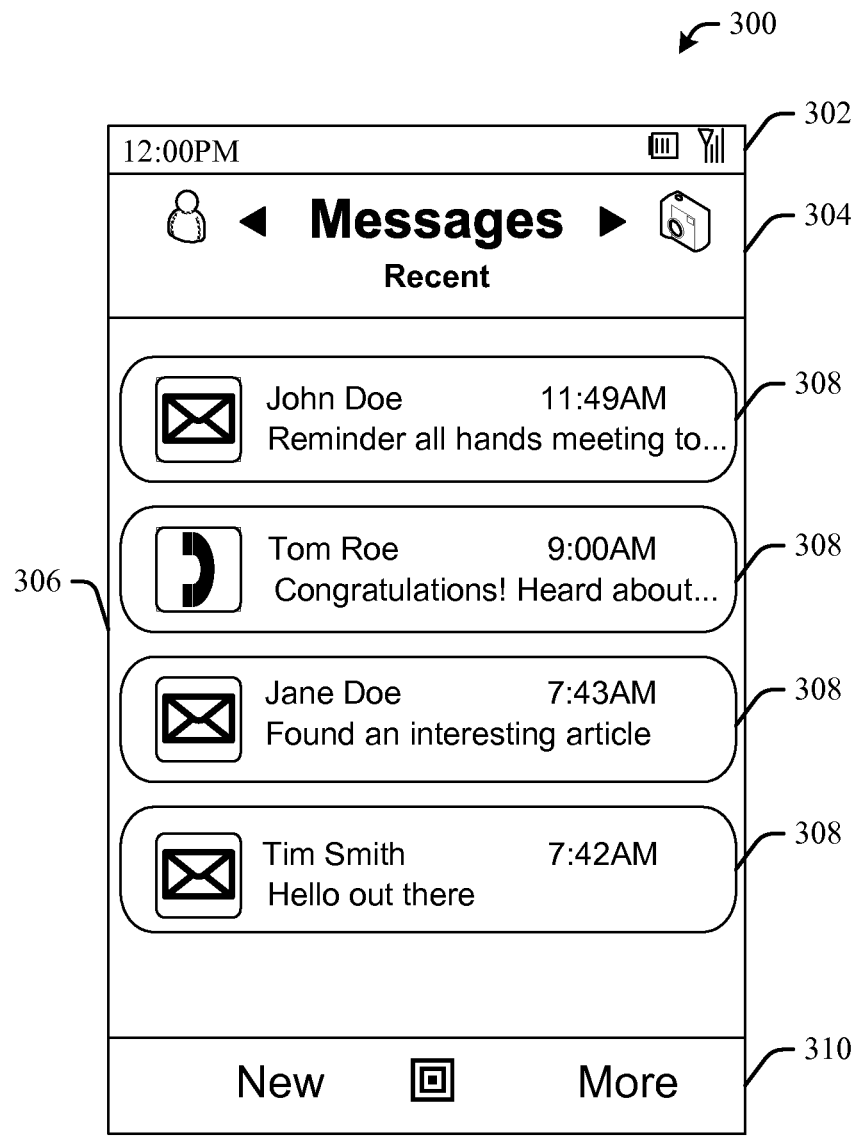
FIG. 3 is an exemplary display depicting an item group in accordance with an aspect of the subject matter disclosed herein.

Referring now to FIG. 3, an exemplary user interface display 300 including an item group is illustrated. The user interface display 300 can include a title bar 302 that can include icons, images and/or text indicating the current time, battery power and connectivity for the mobile device. In addition, the user interface 300 can include an item group control bar 304. The item group control bar 304 can include text labels, graphic images or icons indicating the item group currently displayed upon the user interface 300. The item group control bar 304 can also include text, graphic images or icons indicating additional available item groups. The item group 306 can contain a list of items, such as messages for the user and can be represented as a vertical list of items 308 within the user interface display 300. Each item 308 can indicate content available to the user. In addition, the user interface display 300 can include a softkey bar 310 including one or more softkey functions labels (e.g., New and More). A softkey is typically a button located proximate to the display space. Generally, the function of the button is defined by the softkey function label shown near the button on the display space. Additional controls and features can be included in a user interface display 300.

Item groups 306 can include a set of items 308 that provide users with access to local and/or remote content. The content can be provided or maintained by an application local to the mobile device. Alternatively, content can be retrieved or obtained from a remote source, such as a server. For example, a user may subscribe to a news service. One or more items 308 can provide access to news provided by the news service. In another example, item groups 306 can include items 308 corresponding to one or more maps frequently utilized by the user. Typically, geographic data sets such as maps are large. A mobile device may not have the capacity to store multiple maps. Here, an item group 306 can provide quick access to a selected set of maps stored in a remote data store through a set of items 308.

Items 308 can include content of any data type and each item group 306 can include items of varying data types. For example, an item group can include items representing email messages pertinent to a meeting, a calendar appointment for the meeting and a document relevant to the meeting. In addition, each item 308 can include multiple data types. For instance, an item 308 can include text labels as well as a hyperlink.

Representations of items can include text, graphic images, hyperlinks or any other visual representation. For example, as shown in FIG. 3, icon, graphic images and/or text can be rendered within the same item 308. Further, an image can be used as the background of the item 308 and with text overlaying the image. Each individual item 308 can include multiple cells or columns that can be populated with data of varying data types. For instance, a messaging item 308 can include a column or cell for an icon that can reflect the method of communication (e.g., voicemail or text message), a cell for text including the message content and a cell for text including the sender name. Different columns or cells can have separate tasks associated with the individual columns. Accordingly, selection of an icon can generate different task options than selection of the sender. In addition, items 308 can include audio cues or data. For example, audio data may be triggered when an item 308 is in focus or when an item 308 is selected.

The order of the items 308 within an item group 306 can be modified by a user. A user can position items 308 within an item group 306. Alternatively, the items 308 can be automatically arranged and sorted by metadata associated with each item 308. For example, music can be sorted within the music item group based upon genre, album, or artist. In general, items 308 can be sorted such that the items most likely to be relevant to the user are the most easily accessible.

Referring now to FIGS. 3-6, to facilitate user viewing and/or selection of items, item groups can be presented using a variety of schemes or styles. For example, an item group can be presented as a vertical list of items as illustrated in FIG. 3. In addition, item groups can be represented horizontally, as in a carousel type display illustrated in FIG. 4. In a carousel display, the item group 306 can be represented as a ring of items 308, where the item 308 with focus appears enlarged in the front of any other items 308. If the item 308 to the left is selected, the item 308 to the left gains focus and is enlarged and moved to the front. The item 308 that had focus previously is reduced and shifted to the right. The item groups 306 form a circular list or continuous loop such that if the focus continues to be shifted to the left, eventually, the initial item 308 would regain focus.

Figure 5:
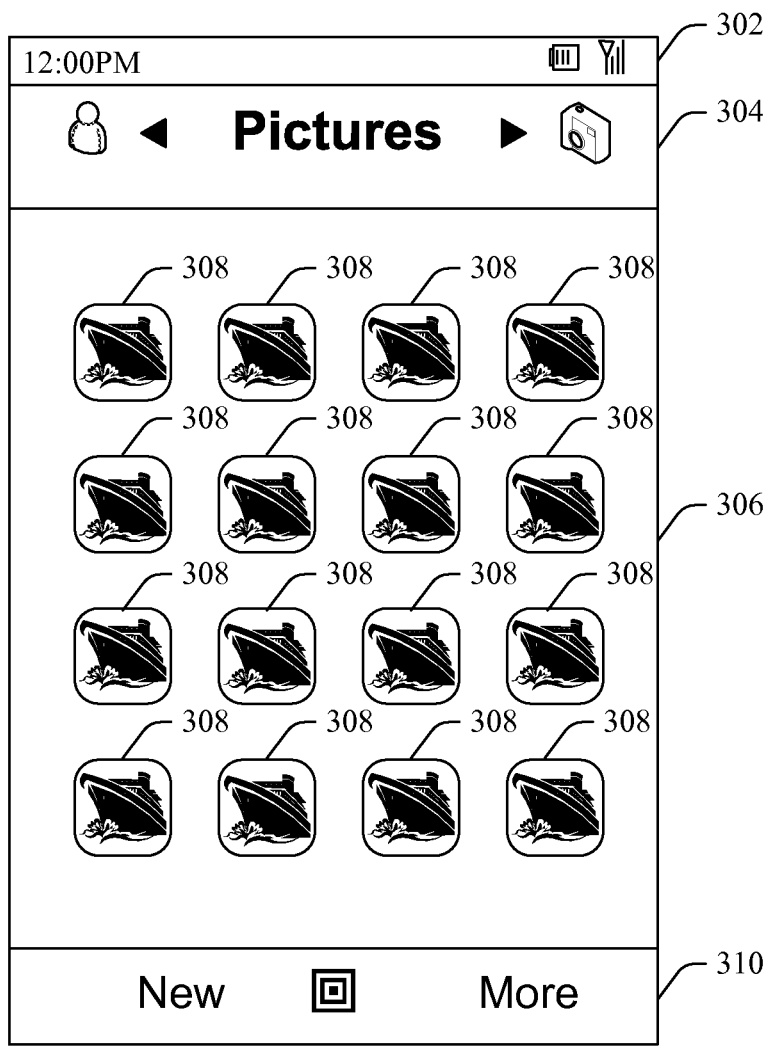
FIG. 5 is an exemplary display depicting an item group in accordance with an aspect of the subject matter disclosed herein.
Figure 6:
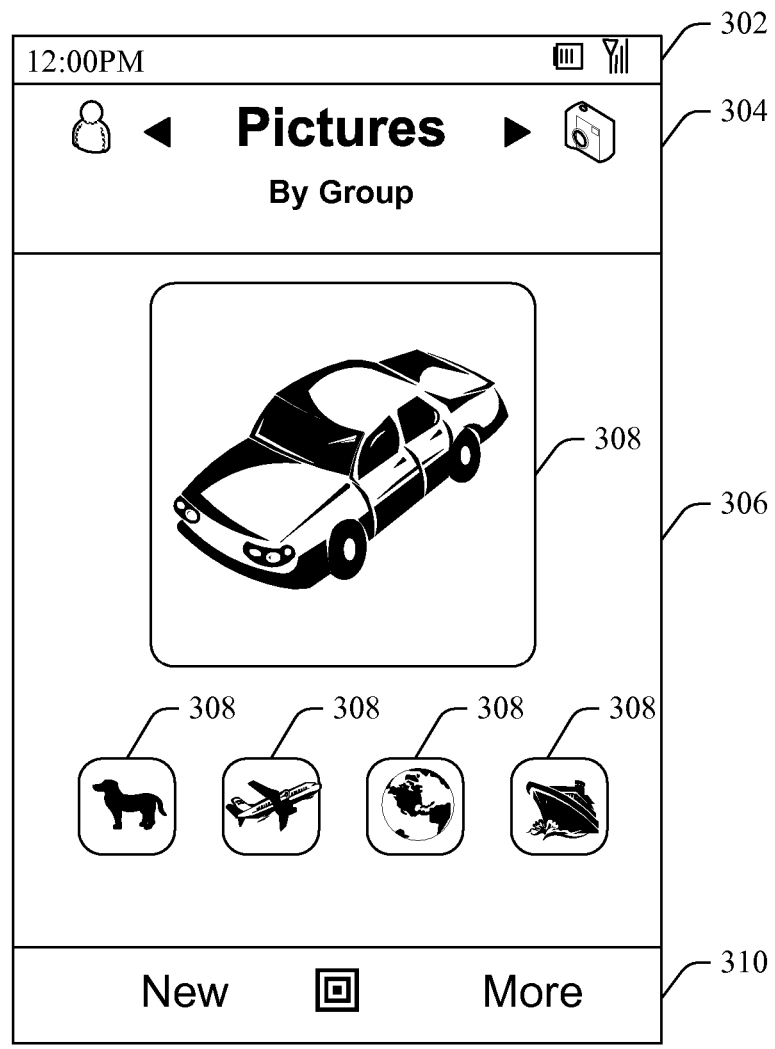
FIG. 6 is an exemplary display depicting an item group in accordance with an aspect of the subject matter disclosed herein.

Item groups can also be represented as grids as illustrated in FIG. 5. Any grid size can be supported and grids can extend off-screen. Scrollbars can be utilized to facilitate viewing and selection of items 308 within a grid. In addition, items 308 in a grid can be of varying size. For example, an item group 306 can be represented such that the item 308 with focus is enlarged and directly above a horizontal display of remaining items 308, as shown in FIG. 6. Possible configurations of item groups are virtually limitless. Item groups can be represented in any arrangement that allows users to view and/or select one or more items. In addition, grids of items can be mapped to the mobile device hardware, such as a number keypad, thereby facilitating selection of items.

In addition, item groups can be rendered differently depending on display orientation, size or resolution. For instance, a messaging list viewed primarily in a high resolution, landscape orientation can display more or richer information per item than the same item group displayed using a vertical list on a portrait display device. Item groups can be redrawn dynamically when changing between portrait and landscape style displays to take advantage of differences in screen width and height.

An item group control bar can be implemented as a pivot control, also referred to as a pivot widget, to facilitate navigation through the set of display item groups. The set of display item groups can be represented as a circular list or a continuous loop of item groups. Consequently, the pivot control allows users to rotate continuously through the loop of item groups. By continuing to move in the same direction, the user can cycle through all the display item groups. Users can use the pivot control to navigate through the loop using an input device such as a keypad, number pad, stylus or the like to move left or right. The pivot control can be accessed by both hardware and software. In general, an item group can be pivoted when a user makes a left or right action on their hardware control or when a user taps on the left or right side of an on-screen pivot control. If the user continues to select the same direction, the labels of the pivot control and the corresponding item group will cycle back to their starting positions. If the item groups are represented as vertical lists the on-screen pivot control does not require focus to be in the pivot control in order to pivot item groups. A user can hit left or right at any time to pivot when using vertical lists, even if focus is on a particular item in the list, rather than on the pivot control.

Figure 4:
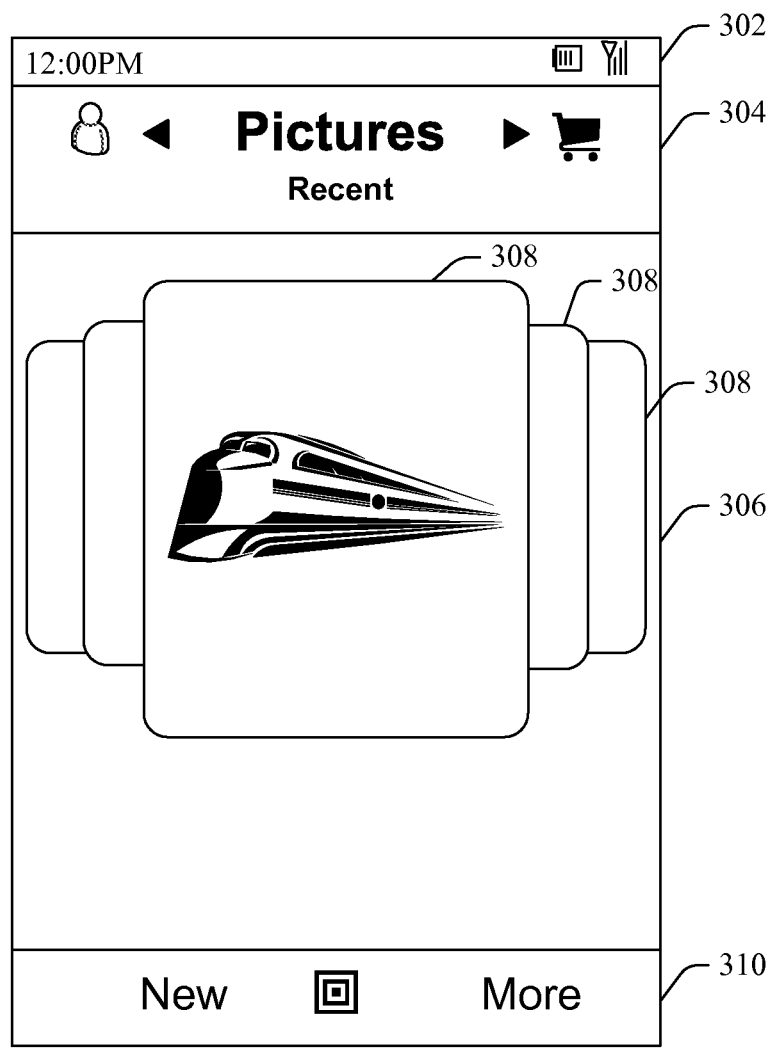
FIG. 4 is an exemplary display depicting an item group in accordance with an aspect of the subject matter disclosed herein.

However, the on-screen pivot control may require focus to pivot an item group that is arranged horizontally, as in the case of a carousel as illustrated in FIG. 4. Consequently, to adjust the pivot of a horizontally oriented list view while navigating the list, users may need to first move focus to the pivot control, and then use a left or right control to change the view of the list. Alternatively, up and down controls can be mapped to left and right movement within a horizontal list, leaving left and right controls free for pivoting between item groups. Grid views, as illustrated in FIG. 5 behave similarly to horizontal lists. The on-screen pivot control may require focus to pivot an item group that is arranged in a grid. Consequently, to adjust the pivot of a grid list view from within the grid, users may first navigate through the grid until the pivot control is in focus, and then use a left or right control to change the view of the list. Alternatively, up and down controls can be used to move horizontally through the grid as well as vertically, leaving left and right controls available for pivoting between item groups.

Figure 7:
FIG. 7 illustrates exemplary pivot controls for use with a set of item groups in accordance with an aspect of the subject matter disclosed herein.
Figure 7:
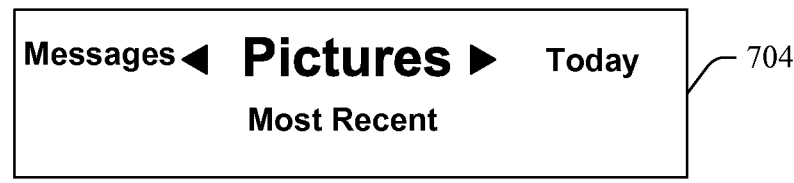
Figure 7:

Referring now to FIG. 7, exemplary pivot controls are illustrated. As shown in pivot control 702, a name or label for the currently displayed item group can be presented in the center of the pivot control. The label can also include a sub-label indicating additional group information, such as how the item group is currently sorted. For example, messages can be sorted by group, pictures by an associated time and the like. Names or labels for one or more item groups adjacent to the current item group within the set of display item groups can be displayed next to the current item group label. These labels allows users to see the item group that will become the current item group if the user pivots right or left. For example, for the pivot control 702, a right pivot can cause the item groups to shift to the left. The result of the right shift can be seen in pivot control 704. Here, the "Messages" item group has been shifted to the left and is no longer the current item group. The current item group has been updated to the item group adjacent and to the right of the previous item group, here the "Pictures" item group.

The pivot control or other navigation controls can be displayed utilizing a variety of schemes or models. For example, one or more icons or graphic images can be used either in addition to or instead of text labels. For instance, pivot control 706 includes a graphic of a camera that can represent an item group including one or more photographic images. A graphic of a person can represent an item group including contact information. Graphic images and icons are illustrated herein using line drawings for simplicity; however, pictures or other graphic images can be used throughout the display space.

Pivot controls or navigation controls can include notifications or alerts. A notification or alert, as used herein, can indicate a change in state, such as updated or new content. For example, in pivot control 702 the number eight is included within parentheses in the text label for the current item group. This parenthetical can indicate that eight new messages have been received, that there are eight total items within the Messages item group or that there are eight items that have not be opened or reviewed. In addition, text notifications such as the exemplary parenthetical, the text color, font, background or other visual cues can be utilized to alert users to changes in item groups or items.

Figure 8:
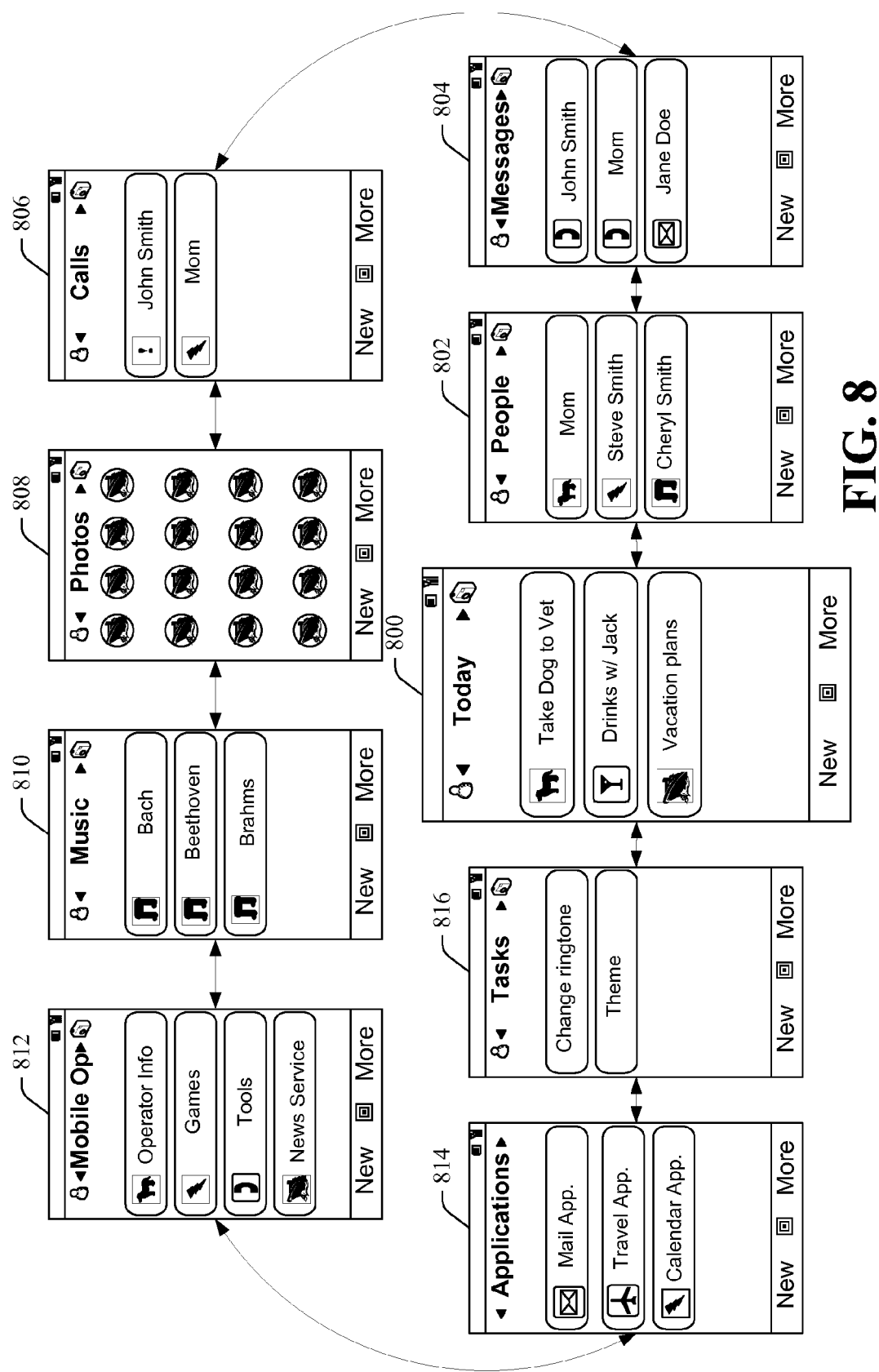
FIG. 8 illustrates an exemplary default set of item groups in accordance with an aspect of the subject matter disclosed herein.

Referring now to FIG. 8, a set of default item groups can be provided to a user. An exemplary set of default item groups can include: Today 800, Important People 802, Recent Messages 804, Recent Calls 806, Recent Photographs 808, Recent Music 810, Mobile Operator 812, Applications 814 and Tasks 816. The Today item group 800 can be a glance-able, extensible list of relevant information about the user's schedule for a given day. The Today item group can be set as the default item group, visible whenever a user launches item groups. As illustrated in FIG. 8, the Today item group 800 is slightly enlarged to indicate that the group has focus.

The Important People item group 802 can be a list of selected or flagged contacts. The People item group can provide quick access to communication methods, presence status, and details. The People item group can be populated by a user utilizing the contact application. When an item representing a contact is selected, the user can be provided with one or more communication methods for the contact depending upon the particular contact. For example, if the contact information for the selected contact includes an email address, but not a telephone number, possible tasks for the item can include contacting the individual or entity via email, but not via telephone.

The Top Tasks item group 816 can include items corresponding to frequently performed device settings and tasks. Finding and changing device settings are frequently among the most complex tasks for users to accomplish on mobile devices. Items can include changing ring tone, changing the device theme, locking the device, updating or modifying the item groups, setting an alarm, adjusting the clock and the like. The ordering and content of the Top Tasks item group can be static and based upon initial defaults. Users may be able to add items corresponding to additional tasks and reorder the items.

The Recent Messages item group 804 can be a consolidated inbox list of all incoming communication attempts. Items can be sorted in any manner convenient to the user, such as sorted latest to earliest. The Recent Messages item group can provide users with a way to quickly check for new mail and can contain email, Short Message Service (SMS), Manufacturing Message Specification (MMS), instant messaging (IM) chat requests, voicemail and the like.

The Recent Calls item group 806 can be a coalesced list of incoming and outgoing calls. This list can be subset of the call history. Each call can be represented separately or individuals can be shown only once, even if multiple calls were made to or from the individuals. The list can also indicate whether the call was incoming or outgoing. The list position of individuals can be determined by their most recent call or the list can be sorted in any manner useful to the user.

The Recent Programs or Applications item group 814 can include items corresponding to the most recent or most frequently used applications accessible via the mobile device. Selecting an item can open and start the application. Possible applications can include a web browser, calendar application, a game or any other application accessible from the mobile device. Items can include application or author logos or graphics images provided by the software application or user.

The Recent Music item group 810 can include a list of recently used music or audio files. Items can include playlists, albums, and songs recently played by the user. The item can also include album art or other graphics associated with the music.

The Recent Photographs item group 808 can include a list of the most recently acquired and/or viewed pictures. The item group can be rendered in any style that provides maximum visibility of pictures. This can include a grid as illustrated in either FIG. 5 or 6, or any other useful configuration. In addition, metadata such as date created or title can be displayed. Items can be sorted by categories, dates or any other metadata associated with the items. The number of items included in the item group can be based upon the dates associated with images. Alternatively, a predetermined number of most recent images can be displayed. Tasks associated with items in the picture item group can include viewing, sharing or editing the pictures.

The Mobile Operator item group 812 can be a placeholder for a mobile operator to provide services or applications to users. The default set of item groups illustrated in FIG. 8 is simply an example of one configuration that can provide a user with quick and easy access to many of the functions and data of the mobile device. The item groups can be used to provide a filtered, subset of the data and functionality of the mobile device. In addition, users can customize item groups and items to ensure that the data and content most relevant to the particular user are provided.

In addition to a set of default item group, such as the item groups illustrated in FIG. 8, users can generate, edit and delete their own item groups. For example, a user can create an item group based upon a project at work. The item group can include a variety of different types of items associated with the project. The project item group can include items corresponding to contact information for co-workers assigned to the project, calendar events such as project meetings, documents associated with the project, emails relevant to the project or any other relevant data or tasks.

The user can select specific data or tasks to be added to an item group. The selected or flagged items can be added to a user-created item group or to a pre-existing item group. For example, a user may frequently send a status mail to his team. The user can open and compose a note and add one or more recipients to the team. The user can then flag the note and add it as a new item to his item group of tasks. Later the user can quickly access the note and send status to his team using the item group of tasks rather than opening an email application, retrieving the note and sending the email. Typically, items selected and added to an item group by a user are static and remain in the item group until removed or acted upon by the user.

Third parties can also provide item groups. Vendors of services or data can generate and offer item groups to a user. For example, a vendor that maintains an online auction website can provide an auction specific item group to a user. The auction item group can include items that track the current status of any auctions in which the user is participating, indicating auction information such as the current bid or remaining time. Items can be updated dynamically to reflect additional bids by the user as well as expiration of item auctions. As shown in this example, the content associated with an item can be obtained from a remote source and items can be dynamically updated based upon that information without direct action by the user.

Vendors can provide item groups to users as a service, which can require a user subscription, or vendors can provide item groups as a method for performing targeted advertising. For example, a clothing retailer can provide an item group that can include items corresponding to online coupons based upon the user's previous purchases. In addition, the retailer can provide additional items associated with new products tailored to the user's buying patterns. In addition, items can be based upon user location. For instance, other items could include information regarding the closest retailer location and/or provided coupons can be selected based upon proximity of the user to a specific store.

In addition, a third party can create an item that can be included in an existing item group. For example, a weather service can provide an item that reflects the current weather and/or forecast for a specific location. If the mobile device is capable of determining its location, the item can update to reflect the weather and forecast for the current location of the mobile device. Items can obtain information from a remote source, such as a web server and display the content. A user can elect to include the weather item in the Today item group or in any other item group, such as a user-generated item group based on the user's vacation plans.

Items can be either static or dynamic. In general, data or tasks that are specifically selected for inclusion are static and do not change or move without user interaction. However, items can also be dynamic. In particular, an item group can include the most frequently used or most frequently used items from a set. For instance, a list can include the ten last songs that were listened to using the mobile device. An item group can also include the ten most frequently used applications available from the mobile device. An item group can include both static and dynamic items. For instance, the first item within an item group can include a static link to acquire content of a particular type (e.g., a link to a news server) and other items in the item group can include items of that content previously acquired (e.g., news articles acquired from the news server). In addition, items can be automatically populated based upon events. The today item group can be automatically updated to include meetings added to the calendar for the current day as well as any other events or information specifically associated with the current day.

In addition, dynamic update of items can be dependent upon content from a remote data source. For example, a user can sign up for a subscription to a music service. The user can elect to have the Music item group automatically update based upon the most frequently used songs of the service to which the user has subscribed. Updates are based not on the users actions, but rather on third party actions, such as selection of music by other subscribers.

The appearance of the item groups can also be customizable. As described above, the lists can be organized on the display utilizing a variety of schemes, such as a vertical scrolling lists, horizontal scrolling lists, grids or any other suitable organization. In addition, color schemes, themes and/or skins can be selected by the user to personalize the appearance of the individual item groups and items. A user can customize appearance of item groups and items based upon aesthetic preferences or to increase usability. For instance, individual item groups can have separate colors, themes or skins to allow a user to identify an item group at a glance. Quick identification can be particularly beneficial when a user is navigating through the set of display item groups.

The appearance of an item group, item, or the control bar can be modified to alert or notify a user of a change in data in the item group. For example, the color of the icons, graphics or text in the control bar, item group and/or items can indicate whether there has been a recent change to the items for an item group. Alternatively, the background color for the icon or image can be updated to indicate a modification. For example, if the user has received a new message, the "Message" text can be rendered in bold font or in a different color.

In addition, as shown above, additional data such as the number of items can be indicated within parentheses next to the item group label.

The systems herein are described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems and methods may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 9:
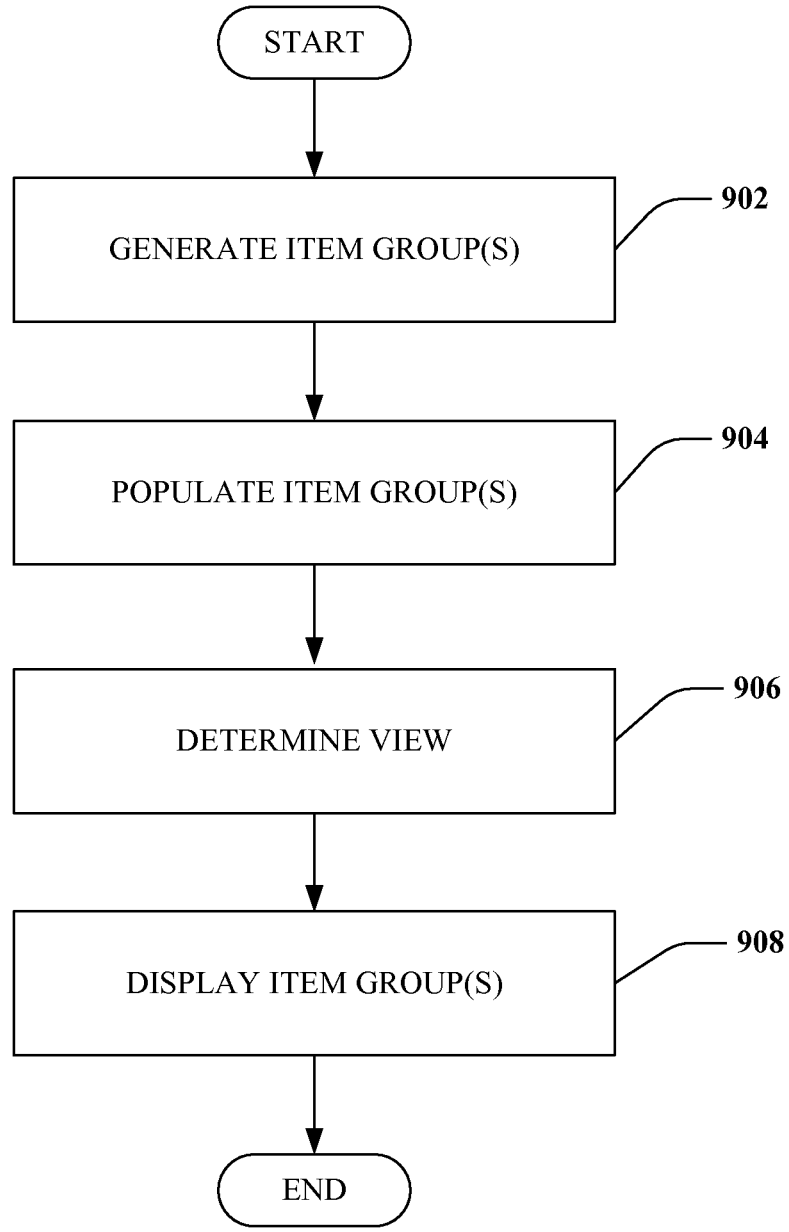
FIG. 9 illustrates a methodology for providing a set of item groups in accordance with an aspect described herein.
Figure 10:
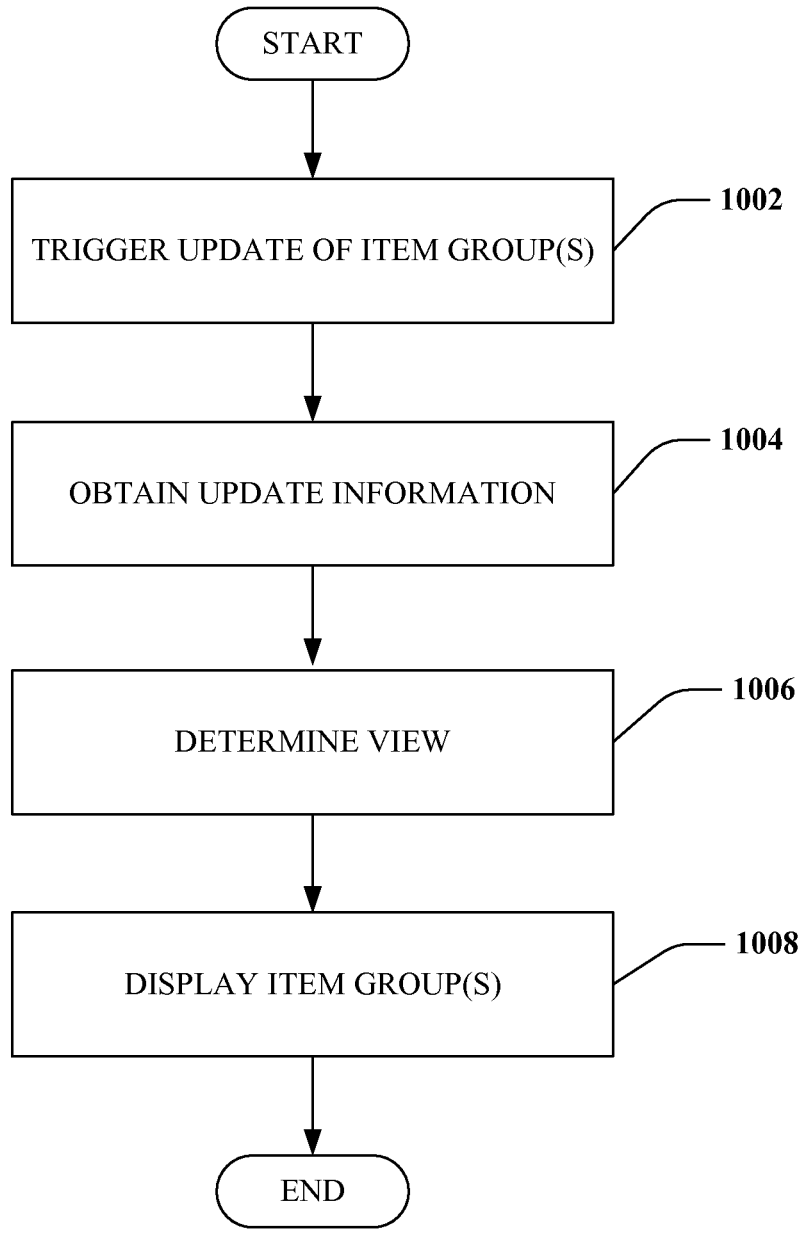
FIG. 10 illustrates a methodology for updating item groups in accordance with an aspect described herein.
Figure 11:
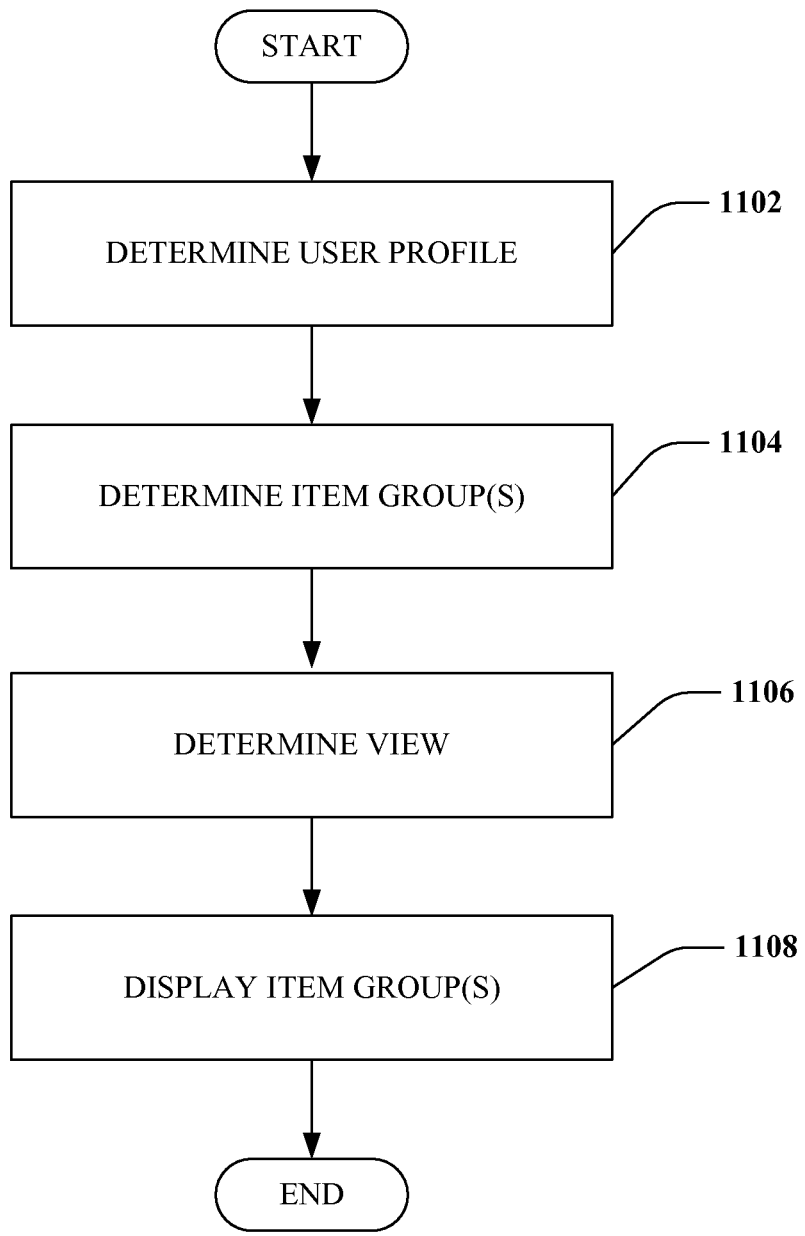
FIG. 11 illustrates a methodology for updating item groups based upon a user profile in accordance with an aspect described herein.

In view of the exemplary systems described herein, methodologies that may be implemented in accordance with the disclosed subject matter will be better appreciated with reference to the flowcharts of FIGS. 9-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Referring now to FIG. 9, a methodology for providing a set of item groups in accordance with an aspect described herein is illustrated. At 902, one or more item groups can be generated. These item groups can include a set of default groups, user-generated groups or third-party item groups provided by vendors, mobile operators and the like. The item groups can be populated with one or more items at 904. Item groups can be populated manually by user selections. Alternatively, the item group can be automatically populated based upon metadata associated with the items. A view of the item groups for display can be determined at 906. Determining the view of the item groups can include determining the item group that has focus, any alerts or notifications and ensuring that the item groups are up to date. At 908, one or more of the item groups are displayed.

Referring now to FIG. 10, a methodology for updating an item group or groups in accordance with an aspect described herein is illustrated. At 1002, an update of the item group or groups is triggered. Updates can be triggered by user input such as addition, deletion or modification of item groups or items. Item groups can also be updated periodically based upon predetermined time intervals. In addition, item group updates can be triggered by changes in content associated with items contained with the item group. The updated information for the item group(s) can be obtained at 1004. Updated information can be obtained upon requested. At 1006, changes to the view of the item group or groups are determined. The display can reflect an update to an item group even if the item group updated is not the current item group pictured onscreen. For example, an update in an item group adjacent to the current item group can be indicated onscreen to alert users to the change. At 1008, the updated item group(s) can be displayed.

Referring now to FIG. 11, a methodology for updating item groups based upon user profile in accordance with an aspect described herein is illustrated. At 1102, a user profile can be selected from one or more possible user profiles. User profiles can define the item groups available for display on the mobile device and can be defined to provide user with relevant content. Selection of a user profile can be based upon location of the mobile device, time of day, day of the week or any other relevant information. At 1104, the item groups to be displayed are selected based upon the user profile. The view of item groups is determined at 1106. For example, the set of item groups can include a default item group, such that the current item group is set to the default item group. Alternatively, the current item group can be set to the last item group displayed. At 1108, the display can be updated in accordance with the selected user profile.

Navigating horizontal lists such as a set of item groups can be inefficient and frustrating for users. Typically, displays of horizontal lists are limited due to the size and/or orientation of display screens. Horizontal orientation of text in many languages (e.g., English, German and Russian) results in list items having a larger horizontal dimension to allow users to read the text labels. The large horizontal dimension reduces the number of items that can be arranged horizontally on the display. Consequently, horizontal lists tend to be less efficient than vertical lists. Frequently, only a small number of list items can be displayed horizontally. This limitation is especially pronounced for mobile devices, where display screen size is particularly limited for portability. Even if icons or short text labels are utilized, horizontal lists can be limited. Although potentially limited in the number of items displayed, horizontal displays can be extremely useful. For instance, where sets of lists are displayed on screen, such as the item groups described above, item groups can be represented as items in a horizontal list, where each item of the horizontal list can contain a vertical list representing items within an item group.

Figure 12:
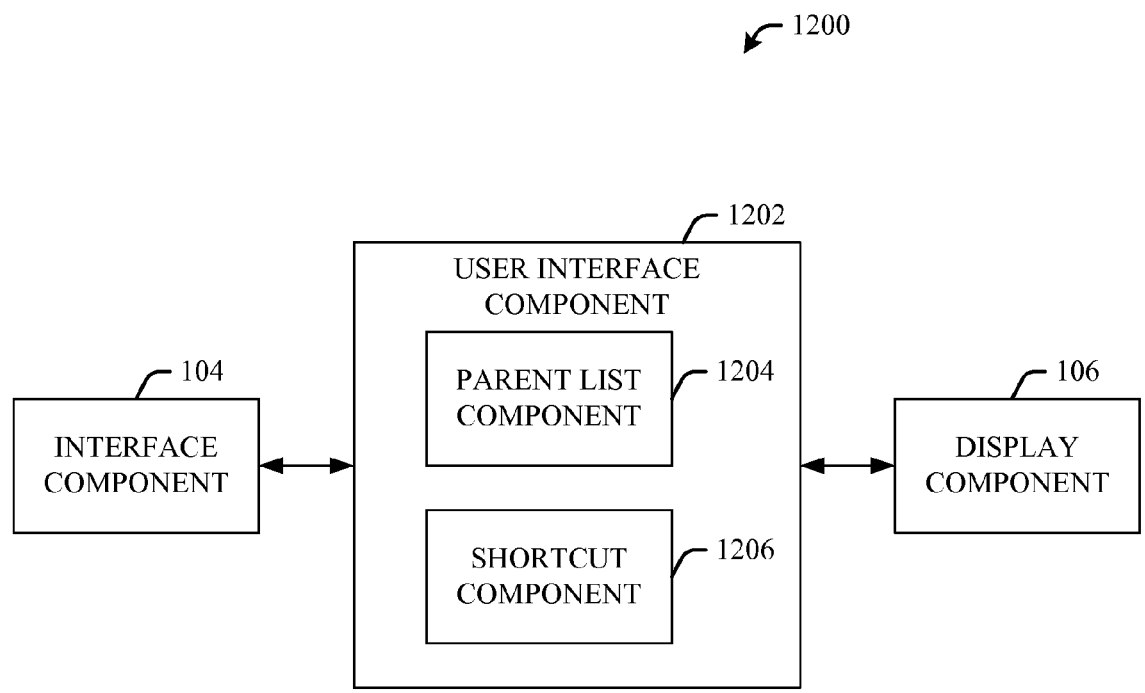
FIG. 12 illustrates a block diagram of a system for generating a shortcut display in accordance with an aspect of the subject matter disclosed herein.

Referring now to FIG. 12, a system 1200 for generating a shortcut display to facilitate navigation of horizontal lists is illustrated. A shortcut display generated by the system 1200 can provide users with the ability to quickly navigate horizontal lists. The system can include a user interface component 1202, an interface component 104 and a display component 106. The user interface component 1202 receives input from one or more interface components 104 and changes the view of a display on a mobile device (not shown) via a display component 106 according to such input. The system 1200 can operate on any type of mobile computing device, including, but not limited to, a PDA, text messenger, cellular phone, pocket personal computer, smartphone, ultra-mobile tablet PC and the like. As described above, input from the interface component 104 can include content obtained from one or more software applications or user input entered using a touch screen, keypad, joystick, button control or any other input device. A single interface component 104 is illustrated herein for simplicity; however, multiple interface components 104 can be utilized including separate interface components for user input and input from software applications.

The user interface component 1202 utilizes input to generate and update lists for display. The user interface component 1202 can include a parent list component 1204 that manages one or more parent lists. Parent lists can include horizontal lists. For example, a parent list could include a set of item groups. In addition, the user interface component 1202 can include a shortcut component 1206 that can generate a shortcut display for an associated parent list.

The shortcut component 1206 can generate a shortcut display in response to input received from the interface component 1204. The shortcut display can be generated in response to either a single or series of button pushes, voice input or any combination of user input. For instance, users can select a button to move left or right through the horizontal list that serves as the parent list to the shortcut list. By holding the button down, a user can trigger generation of a shortcut display. Visual effects such as blurring of the display can be used to indicate that the view displayed is transitioning from the parent horizontal list display to the shortcut display.

Figure 13:
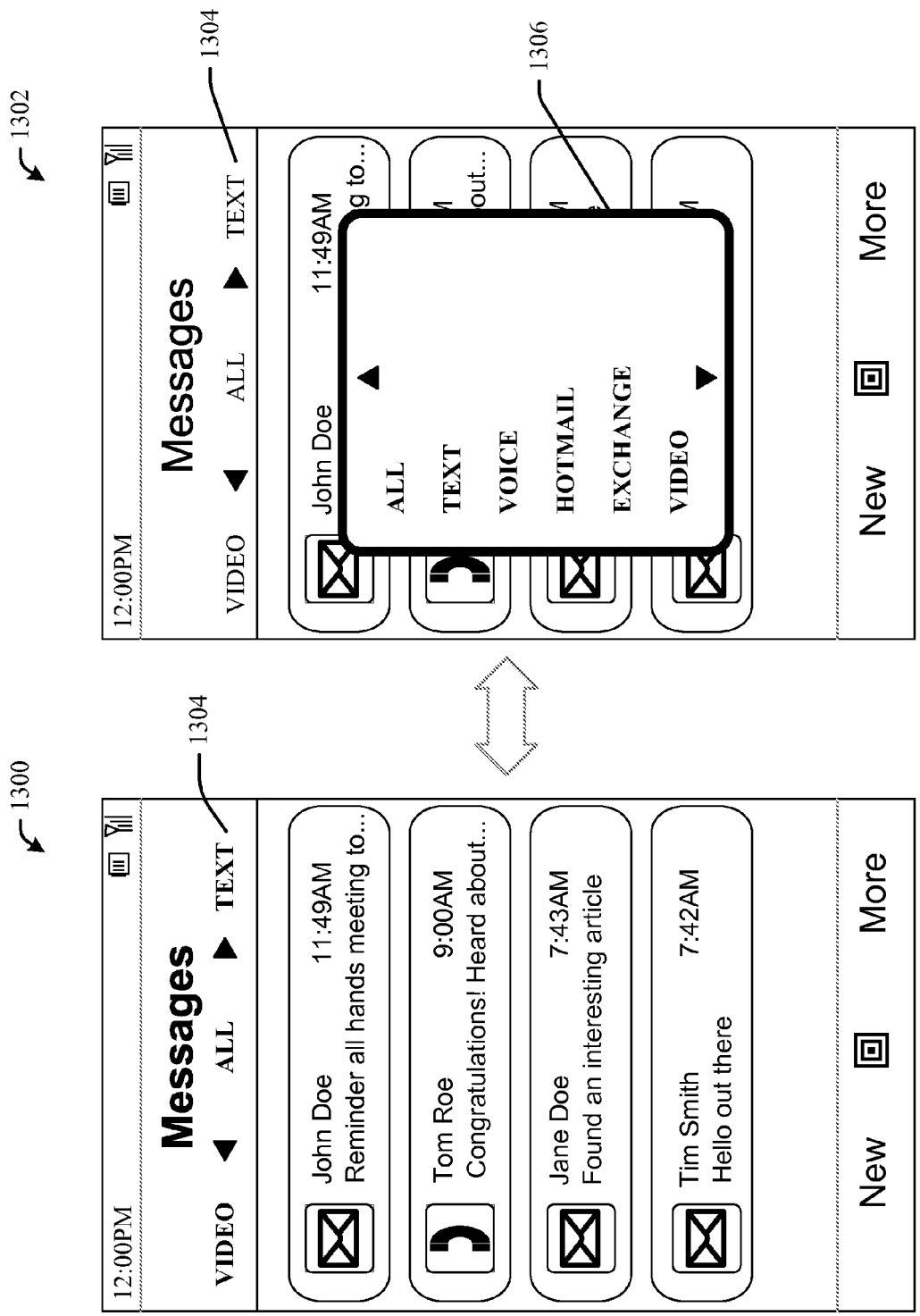
FIG. 13 includes exemplary displays illustrating the transition from a parent list to a shortcut display in accordance with an aspect of the subject matter disclosed herein.

Referring now to FIG. 13, exemplary displays illustrate the transition from a horizontal or parent list display 1300 to a shortcut display 1302. Exemplary parent list display 1300 includes a horizontal list 1304 of message types (e.g., "Video," "All" and "Text"). Each item in the horizontal list 1304 has an associated vertical list of messages for that message type. The exemplary shortcut display of 1302 can be generated based upon the parent list display 1300 in response to user input. The shortcut display 1302 can continue to display all or a portion of the parent list display 1302 in the background to provide context for the shortcut list 1306. The parent list 1304 can be shaded in grey on the shortcut display 1302 to deemphasize the parent list 1304. The shortcut list 1306 can be represented as a vertical list, as shown in FIG. 13. Alternatively, the shortcut list 1306 can be represented as a grid. The shortcut list 1306 can include the items of the parent horizontal list. The orientation of the shortcut list 1306 can allow more items to be displayed to a user at any one time. Additional entries or items in the shortcut list 1306 not rendered to the display can be viewed by scrolling the shortcut list 1306. The shortcut list 1306 can scroll either up or down and scrolling can be indicated by arrows at the top and bottom of the shortcut list 1306.

Various color schemes, themes and/or skins can be selected by a user to personalize the appearance of individual shortcut lists. A user can customize appearance of shortcut lists and items based upon aesthetic preferences or to increase usability. For instance, shortcut displays can have colors, themes or skins based upon the parent list to allow a user to identify a shortcut display at a glance.

Figure 14:
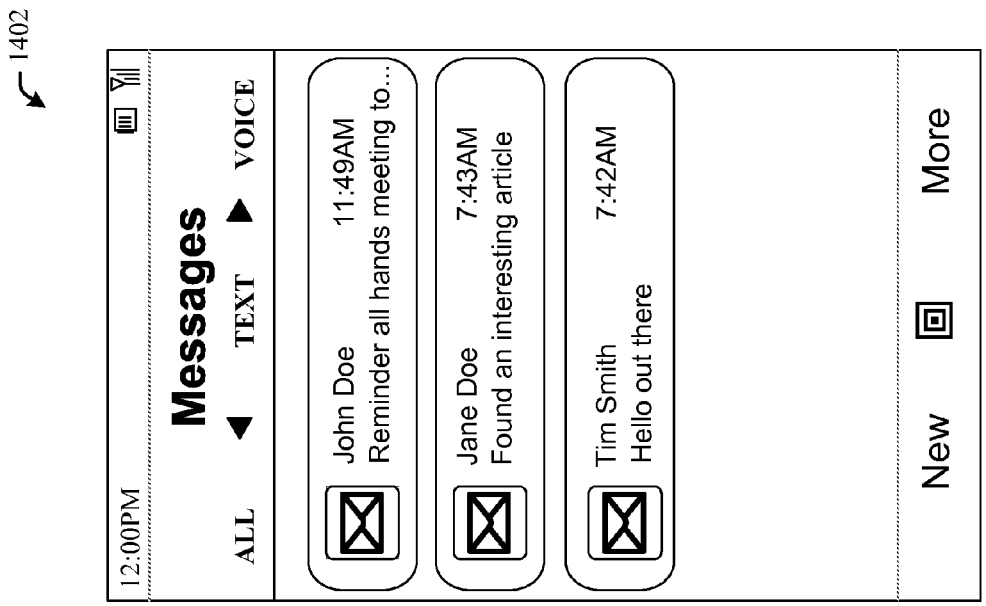
FIG. 14 includes exemplary displays illustrating the return from a shortcut display to a parent list in accordance with an aspect of the subject matter disclosed herein.
Figure 14:
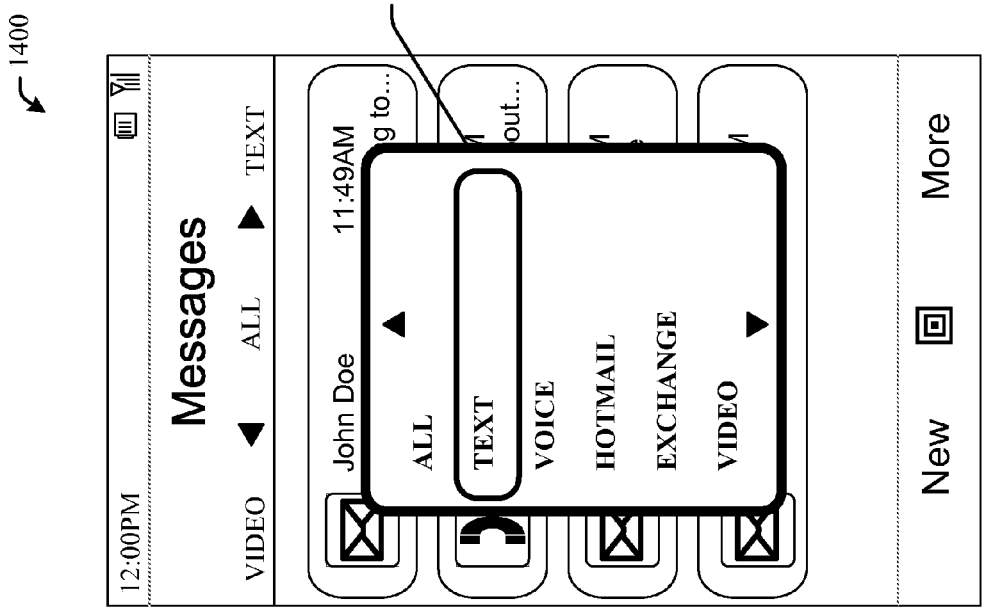

Referring now to FIG. 14, exemplary displays illustrate the return from a shortcut display 1400 to a parent list display 1402. Selection of an item in the shortcut list 1404 results in a return to an updated parent list. In response to the selection of an item in the shortcut list 1404, the parent list is updated, such that the selected item from the shortcut list is displayed as the current item in the parent list. For instance, in the exemplary displays of FIG. 14, selection of the second item in the shortcut list 1404, "text," results in the parent list being displayed with the current item "text." As shown in parent list display 1402 the vertical list, if any, displayed would be the vertical list associated with the "text" item.

Figure 15:
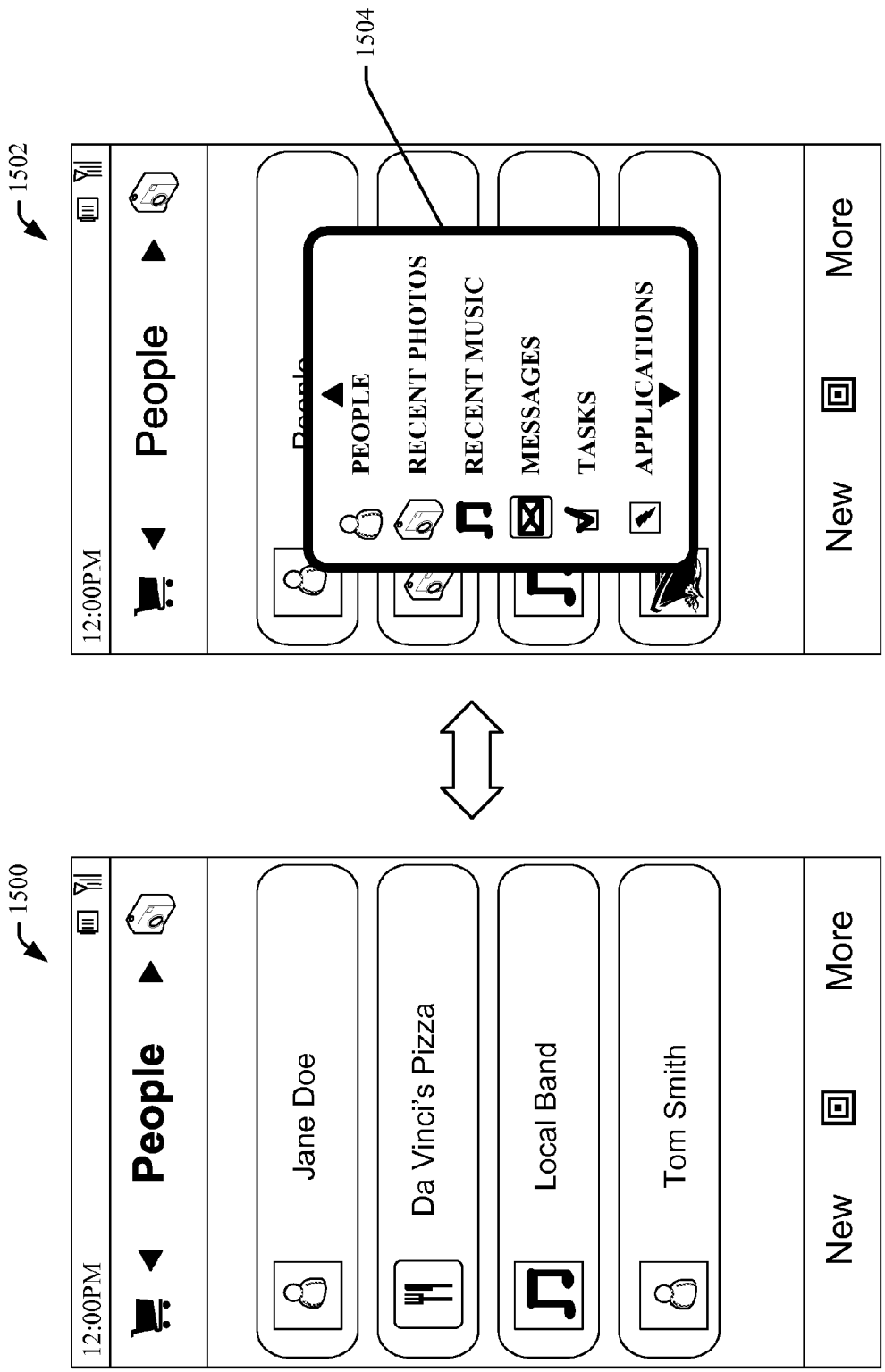
FIG. 15 includes exemplary displays illustrating the use of a shortcut display to facilitate navigation among the item groups in accordance with an aspect of the subject matter disclosed herein.

Referring now to FIG. 15, exemplary displays illustrate the use of a shortcut display to facilitate navigation among item groups. It can become cumbersome to navigate through each item group for large numbers of item groups included within a set of display item groups, as shown in item group display 1500. Rather than moving in order through the set of item groups, a user can trigger generation of a shortcut display 1502 that includes a shortcut list 1504 containing item groups from the set of display item groups. Here, the shortcut list 1504 displays a list of the display item groups (e.g., People, Recent Photos, Recent Music, Messages, Tasks and Applications). Selecting an item group from the shortcut list 1504 results in a return to the display item groups and immediate navigation to the selected item group within the parent or item group display 1500.

Figure 16:
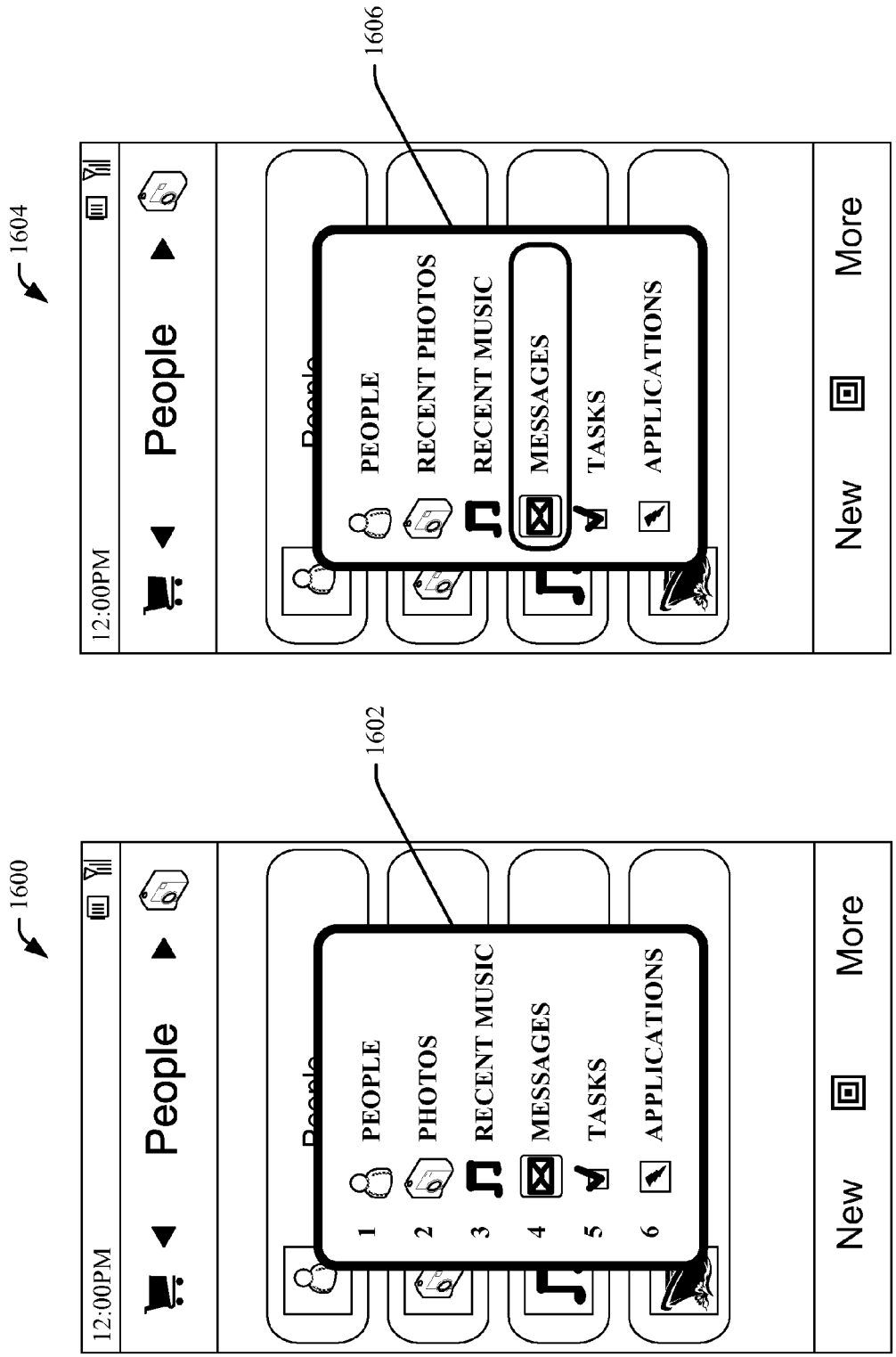
FIG. 16 includes exemplary shortcut displays in accordance with an aspect of the subject matter disclosed herein.

Referring now to FIG. 16, items in a shortcut list 1602 can be displayed or rendered as text, graphics, icons or any combination thereof. As shown in exemplary display 1600, each item in the shortcut list 1602 can include an icon or graphic image and/or text associated with the item. In addition, each item in the shortcut list 1602 can have an associated number. A user can select an item from the shortcut list 1602 by entering the associated number on a keypad, rather than scrolling through the shortcut list 1602. The numbers can be consistently associated with the same the items in the shortcut list 1602, allowing users to become familiar with numbers and allowing a user to quickly navigate through the shortcut list 1602.

As shown in exemplary display 1604, an item with focus in the shortcut list 1606 can be outlined or indicated with a separate border. Alternatively, the item with focus can have a distinct background color. Any method of visually distinguishing the item can be utilized. In addition, items in the shortcut list 1606 can be color coordinated either for aesthetics or to assist users in locating items quickly. Color schemes, themes and/or skins for items can be selected by the user to personalize the appearance of the shortcut list 1606 and items. A user can customize appearance of items for aesthetics or usability.

Item can be ordered or positioned within the shortcut list to assist users in locating desired items. Items can be positioned within a list in a consistent, predetermined order. Consistent positioning of items allows users to memorize location of items within shortcut lists, facilitating rapid location of items. Alternatively, items can be dynamically positioned in lists such that items currently of interest to a user are visible on screen and/or easily selectable. Items can be positioned in the shortcut list based upon the item with focus in the parent list. Position within the shortcut list can also be determined based upon recent navigation through the parent list. For instance, if the user navigates through several items in the parent list before triggering the shortcut list, the items can be positioned within the shortcut list based upon such navigation. The items through which the user has recently navigated need not be displayed in the shortcut list, or can be displayed at the bottom of the list.

Figure 17:
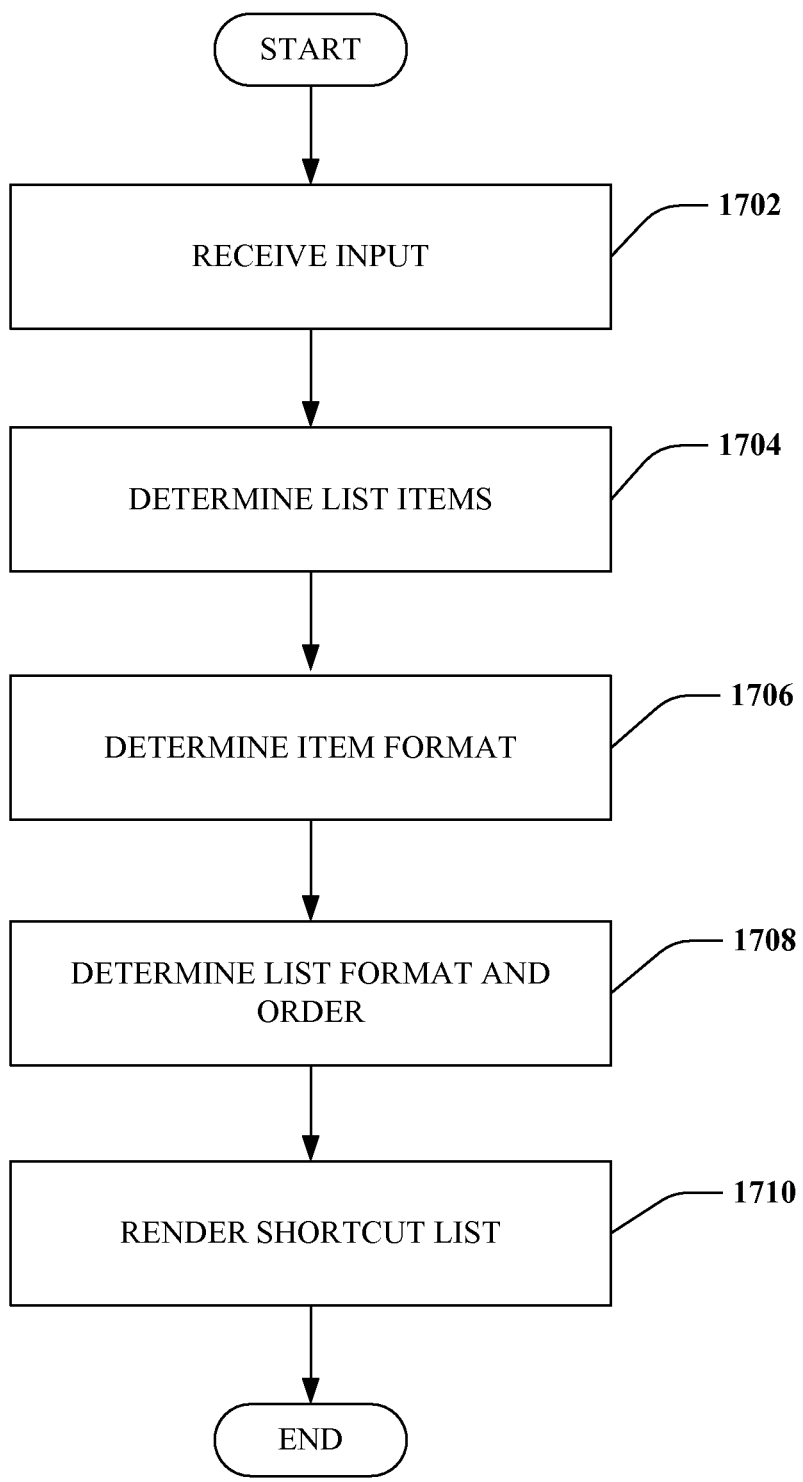
FIG. 17 illustrates a methodology for displaying a shortcut display in accordance with an aspect described herein.

Referring now to FIG. 17, a methodology for displaying a shortcut list is illustrated. At 1702, input is received that triggers the shortcut display. Input can include user input such as selection of a button on a keypad, a stylus, or the like. Upon receipt of input triggering display of the shortcut list, the items to be displayed in the shortcut list are determined at 1704. The items to be displayed in the shortcut list include the items of the parent list. For each item, a display format for the item within the shortcut list is determined at 1706. Text, icons or graphics associated with the items from the parent list can be used to display the item in the shortcut list. However, the items need not be rendered in the same manner in both the parent list and the shortcut list. For instance, the shortcut list can include additional text, icons or other audiovisuals not necessarily included in the parent horizontal list. Alternatively, an item in a shortcut list can include a subset of the audiovisual data associated with the item within the parent list.

At 1708, the format and order of the shortcut list is determined. The format can include color scheme, background graphics and list style. In addition, the order of the items within the shortcut list is determined. The order of items in the list can be based in part upon the item in the parent list with focus when the shortcut display was triggered. If a user has already navigated through a portion of the parent list prior to invoking the shortcut display, the items in the shortcut list can be ordered to reflect this movement or current position within the parent display. Alternatively, items can be displayed in a consistent order or position in the list and the item with focus from the parent list can have focus within the shortcut list. At 1710, the shortcut list is rendered to the display.

Figure 18:
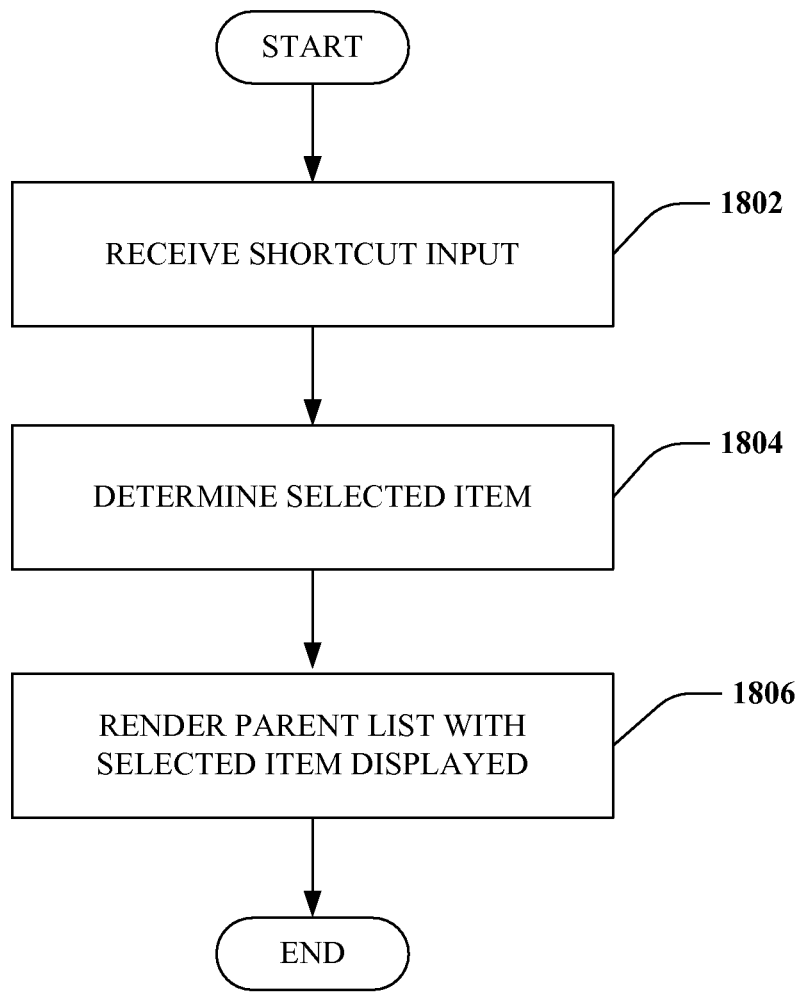
FIG. 18 illustrates a methodology for returning to a parent list from a shortcut display in accordance with an aspect described herein.

Referring now to FIG. 18, a methodology for utilizing a shortcut list is illustrated. At 1802, shortcut input is received. Shortcut input includes selection of an item in the shortcut list. A determination is made as to the selected item in the shortcut list at 1804. At 1806, the parent list of the shortcut list is rendered on the display. The selected item of the shortcut list can have focus when the parent list is displayed.

Figure 19:
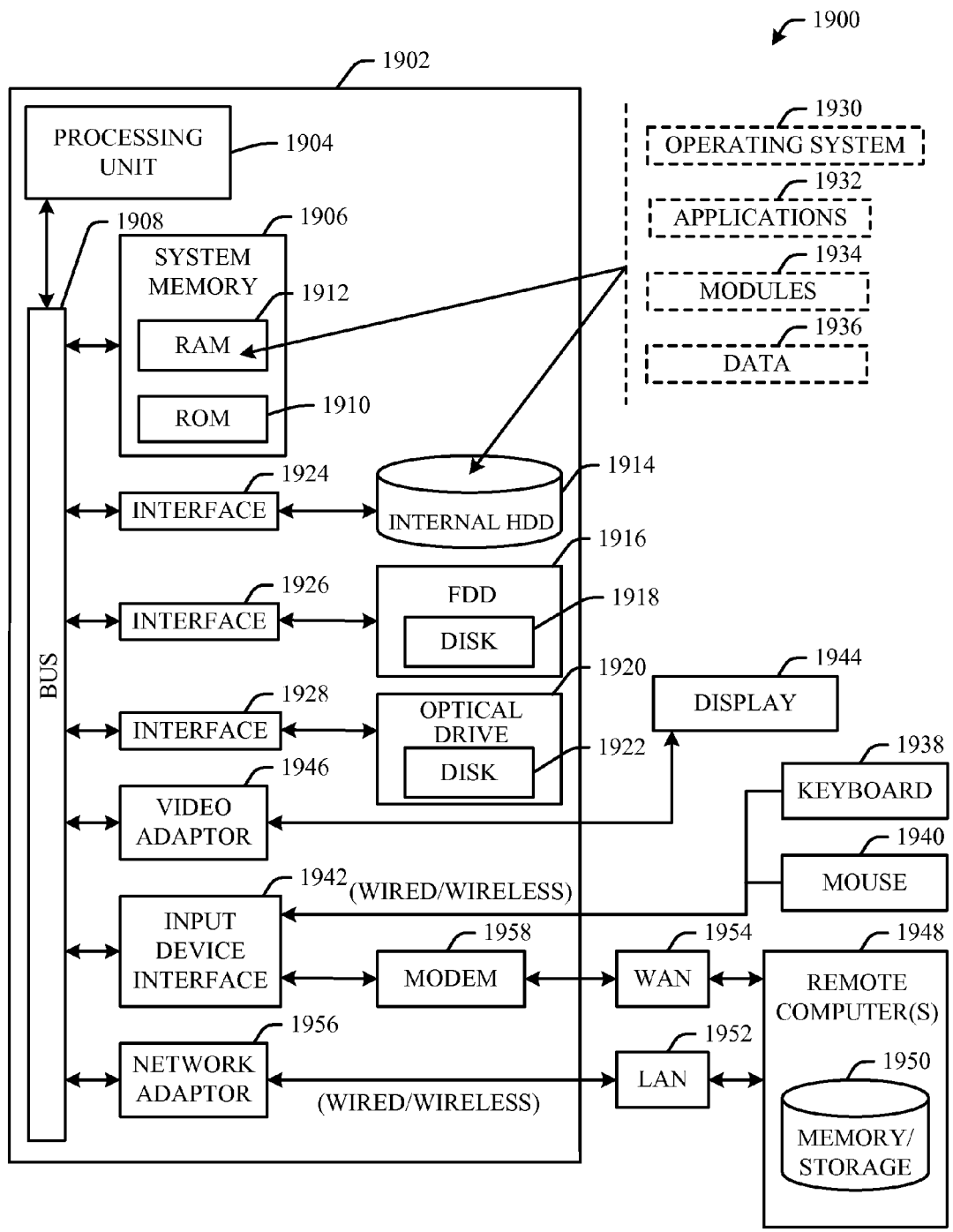
FIG. 19 is a schematic block diagram illustrating a suitable operating environment.
Figure 20:
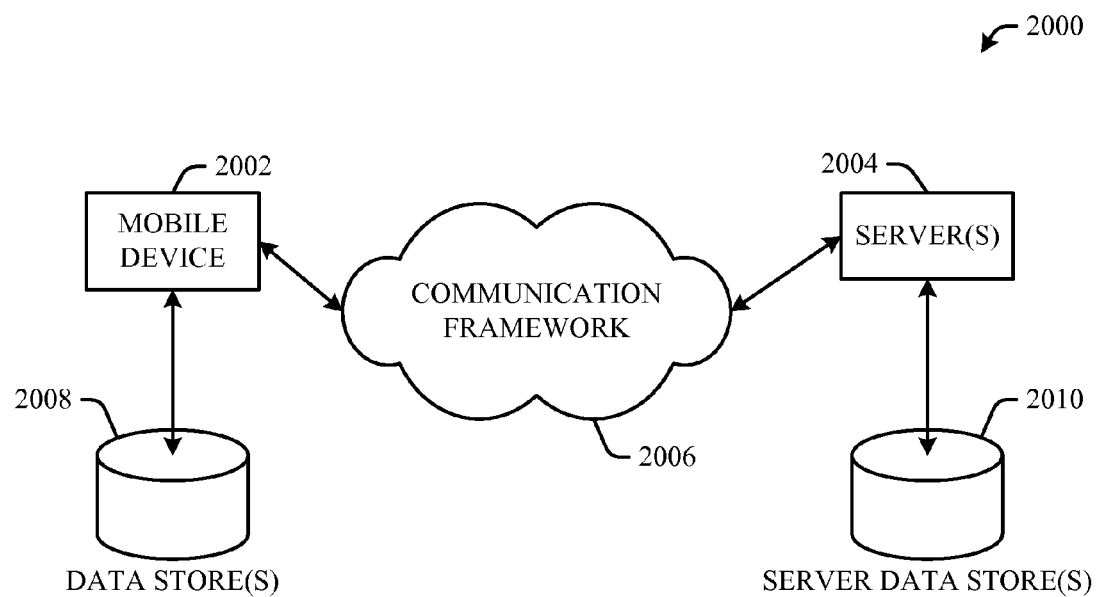
FIG. 20 is a schematic block diagram of a sample-computing environment.

In order to provide a context for the various aspects of the disclosed subject matter, FIGS. 19 and 20 as well as the following discussion are intended to provide a brief, general description of a suitable environment in which the various aspects of the disclosed subject matter may be implemented. While the subject matter has been described above in the general context of computer-executable instructions of a computer program that runs on a mobile device including a computer and/or computers, those skilled in the art will recognize that the innovations described herein also may be implemented in combination with other program modules or software applications. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., PDA, phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the subject matter described herein can be practiced on stand-alone computers, including mobile devices. In a distributed computing environment, program modules may be located in both local and remote memory storage devices.

With reference again to FIG. 19, the exemplary environment 1900 for implementing various aspects of the embodiments includes a mobile device or computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures may also be employed as the processing unit 1904.

The system memory 1906 includes read-only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer or mobile device 1902 further includes an internal hard disk drive (HDD) 1914 (e.g., EIDE, SATA), which internal hard disk drive 1914 may also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1394 interface technologies. Other external drive connection technologies are within contemplation of the subject systems and methods.

The drives and their associated computer-readable media provide nonvolatile storage of data, data structures, computer-executable instructions, and so forth. Consequently, the item group instructions can be stored using the drives and their associated computer-readable media. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1912, including an operating system 1930, one or more application programs 1932, other program modules 1934 and program data 1936. The application programs 1932 can provide content for the item groups. All or portions of the operating system, applications, modules, and/or data can also be cached in the RAM 1912. It is appreciated that the systems and methods can be implemented with various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) may include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 1394 serial port, a game port, a USB port, an IR interface, etc. A display device 1944 can be used to provide a set of group items to a user. The display devices can be connected to the system bus 1908 via an interface, such as a video adapter 1946.

The mobile device or computer 1902 may operate in a networked environment using logical connections via wired and/or wireless communications to one or more remote computers, such as a remote computer(s) 1948. For example, the item group instructions can be local to the computer 1902 and software applications can be located remotely on a remote computer 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which may connect to a global communications network, e.g., the Internet.

When used in a LAN networking environment, the computer 1902 is connected to the local network 1952 through a wired and/or wireless communication network interface or adapter 1956. The adaptor 1956 may facilitate wired or wireless communication to the LAN 1952, which may also include a wireless access point disposed thereon for communicating with the wireless adaptor 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with any wireless devices or entities operatively disposed in wireless communication, e.g., a printer, scanner, desktop and/or portable computer, PDA, communications satellite, any piece of equipment or location associated with a wirelessly detectable tag (e.g., a kiosk, news stand, restroom), and telephone. The wireless devices or entities include at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 20 is a schematic block diagram of a sample environment 2000 with which the systems and methods described herein can interact. The system 2000 includes one or more mobile device(s) 2002. The mobile device(s) 2002 can be hardware and/or software (e.g., threads, processes, computing devices). The system 2000 also includes one or more server(s) 2004. Thus, system 2000 can correspond to a two-tier client server model or a multi-tier model (e.g., client, middle tier server, data server), amongst other models. The server(s) 2004 can also be hardware and/or software (e.g., threads, processes, computing devices). One possible communication between a mobile device 2002 and a server 2004 may be in the form of a data packet adapted to be transmitted between two or more computer processes. The system 2000 includes a communication framework 2006 that can be employed to facilitate communications between the mobile device(s) 2002 and the server(s) 2004. The mobile device(s) 2002 can be operably connected to or include one or more data store(s) 2008 that can be employed to store information local to the mobile device(s) 2002. Similarly, the server(s) 2004 are operably connected to one or more server data store(s) 2010 that can be employed to store information local to the servers 2004.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system that facilitates navigation on a mobile device, comprising:
    a memory that stores computer executable instructions; and
    a processor that processes said computer executable instructions to implement at least one interface component, a user interface component, and a display component, wherein said user interface component receives an input from said at least one interface component,
    wherein said display component transitions a view from a horizontal parent list to an associated short cut list represented as a vertical list or as a grid in response to the received input at said user interface component,
    wherein a parent list component updates the horizontal parent list with the selected item from the shortcut list upon selection and displays that selected item as a current item in the horizontal parent list, and
    wherein the short cut list further includes selected items from recent navigation selections from the horizontal parent list as current items in the short cut list.

2. The system of claim 1, wherein the display component further blurs the view to indicate a transition from the horizontal parent list to the shortcut list.

3. The system of claim 1, wherein said processor further processes said computer executable instructions to implement:
    the parent list component managing a plurality of parent lists; and
    a shortcut component that generates the shortcut list for one of the plurality of parent lists as a function of the received input.

4. The system of claim 3, wherein a shortcut display component displays at least a portion of the parent list in a background to provide context for the shortcut list.

5. The system of claim 3, wherein a shortcut display component obscures the parent list.

6. The system of claim 1, wherein the display component color-codes items in the shortcut list.

7. The system of claim 1, wherein the shortcut list includes items of the horizontal parent list.

8. The system of claim 1, wherein the shortcut list includes arrows to facilitate scrolling through the shortcut list.

9. The system of claim 1, wherein the display component positions items within the shortcut list in a consistent and predetermined order.

10. The system of claim 1, wherein the display component dynamically positions items in the shortcut list so that a recent navigation item from the horizontal parent list is visible on a screen.

11. The system of claim 1, wherein the shortcut list facilitates navigation among item groups of a set of display item groups displayed in the horizontal view parent list by displaying recently selected item groups from the horizontal view parent list upon selection of corresponding display item groups of the short cut list and providing immediate navigation to a selected display item group from the short cut list.

12. A computer-implemented method for displaying a shortcut list, comprising:
   the computer receiving an input that triggers a shortcut display;
   the computer determining items to display in a shortcut list in response to the received input;
   the computer selecting a display format for the shortcut list;
   the computer establishing an order of the items included in the shortcut list;
   the computer transitioning from a horizontal list view to a shortcut list view wherein the shortcut list is represented as a vertical list or as a grid;
   the computer generating from the shortcut list an updated horizontal parent list with a display item selected from the shortcut list view for display of the selected display item as a current item in the updated horizontal parent list;
   the computer generating a shortcut list view updated with selected items from recent navigation selections from the horizontal parent list, where recent navigation selections are displayed as current items in the shortcut list view; and
   the computer rendering the shortcut list on a display.

13. The method of claim 12, wherein determining items to display in a shortcut list in response to the received input includes selecting a subset of items from a horizontal view parent list.

14. The method of claim 13, wherein rendering the shortcut list on a display comprises rendering the items in the shortcut list in a format different from a format of the items in the parent list.

15. The method of claim 12, establishing an order of the items included in the shortcut list is based in part on an item in the parent list with focus on when the input was received.

16. The method of claim 12, wherein rendering the shortcut list on a display comprises using text, icons or graphics associated with items in the parent list.

17. The method of claim 12, wherein rendering the shortcut list on a display comprising reflecting a movement or current position within the parent list.

18. A computer readable storage medium, excluding a transitory signal, comprising computer executable instructions that when executed by a processor cause said processor to implement a method comprising:
   managing a plurality of parent lists;
   receiving a request for a shortcut list;
   generating the shortcut list for at least one of the plurality of parent lists; and
   transitioning from a horizontal view parent list to the requested shortcut list represented as a vertical list or as a grid in response to the received request, wherein the shortcut list facilitates navigation among item groups of a set of display item groups displayed in the horizontal view parent list by displaying recently selected item groups from the horizontal view parent list upon selection of corresponding display item groups of the short cut list;
   generating a horizontal list view updated with selected items from recent navigation selections, where selected items from the shortcut list are displayed as current items in the horizontal list view; and
   providing immediate navigation to a selected display item group from the short cut list.

19. The computer readable storage medium of claim 18, further comprising computer executable instructions that when executed by said processor cause said processor to implement the additional steps of:
   establishing an order of the shortcut list based in part on an item in the horizontal view parent list with focus on when the request was received; and
   blurring a view to indicate a transition from the horizontal view parent list to the shortcut list.

* * * * *